United States Patent
Agiomyrgiannakis

(10) Patent No.: US 9,177,549 B2
(45) Date of Patent: *Nov. 3, 2015

(54) METHOD AND SYSTEM FOR CROSS-LINGUAL VOICE CONVERSION

(71) Applicant: Google Inc., Mountain View, CA (US)

(72) Inventor: Ioannis Agiomyrgiannakis, London (GB)

(73) Assignee: Google Inc., Mountain View, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 14/069,492

(22) Filed: Nov. 1, 2013

(65) Prior Publication Data
US 2015/0127349 A1 May 7, 2015

(51) Int. Cl.
| | |
|---|---|
| *G10L 15/00* | (2013.01) |
| *G10L 15/04* | (2013.01) |
| *G10L 15/14* | (2006.01) |
| *G06F 17/28* | (2006.01) |
| *G10L 13/02* | (2013.01) |
| *G10L 15/07* | (2013.01) |
| *G10L 13/033* | (2013.01) |
| *G10L 15/26* | (2006.01) |

(52) U.S. Cl.
CPC ............ *G10L 15/142* (2013.01); *G06F 17/289* (2013.01); *G10L 13/02* (2013.01); *G10L 13/0335* (2013.01); *G10L 15/07* (2013.01); *G10L 15/144* (2013.01); *G10L 15/26* (2013.01)

(58) Field of Classification Search
USPC .............. 704/256, 240, 251, 254, 255, 256.1, 704/256.2, 256.5, 256.6
See application file for complete search history.

(56) References Cited

U.S. PATENT DOCUMENTS

| | | | | |
|---|---|---|---|---|
| 5,129,002 | A | * | 7/1992 | Tsuboka ..................... 704/246 |
| 5,307,444 | A | * | 4/1994 | Tsuboka ....................... 706/20 |
| 5,440,662 | A | * | 8/1995 | Sukkar ......................... 704/236 |
| 5,617,509 | A | * | 4/1997 | Kushner et al. .............. 704/256 |
| 5,679,001 | A | * | 10/1997 | Russell et al. ................ 434/185 |
| 6,125,345 | A | * | 9/2000 | Modi et al. ................... 704/240 |
| 6,212,500 | B1 | * | 4/2001 | Kohler ......................... 704/256 |

(Continued)

OTHER PUBLICATIONS

Mouchtaris et al., "Non-Parallel Training for Voice Conversion by Maximum Likelihood Constrained Adaptation," Proceedings of the IEEE International Conference on Acoustics, Speech, and Signal Processing 2004 (ICASSP 2004), vol. 1, pp. I-1 to I-4.

(Continued)

*Primary Examiner* — Edgar Guerra-Erazo
(74) *Attorney, Agent, or Firm* — McDnnell Boehnen Hulbert & Berghoff LLP

(57) ABSTRACT

A method and system for is disclosed for cross-lingual voice conversion. A speech-to-speech system may include hidden Markov model (HMM) HMM based speech modeling for both recognizing input speech and synthesizing output speech. A cross-lingual HMM may be initially set to an output HMM trained with a voice of an output speaker in an output language. An auxiliary HMM may be trained with a voice of an auxiliary speaker in an input language. A matching procedure, carried out under a transform that compensates for speaker differences, may be used to match each HMM state of the output HMM to a HMM state of the auxiliary HMM. The HMM states of the cross-lingual HMM may be replaced with the matched states. Transforms may be applied to adapt the cross-lingual HMM to the voices of the auxiliary speaker and of an input speaker. The cross-lingual HMM may be used for speech synthesis.

36 Claims, 12 Drawing Sheets

(56) References Cited

U.S. PATENT DOCUMENTS

| | | | |
|---|---|---|---|
| 6,460,017 B1* | 10/2002 | Bub et al. | 704/256 |
| 6,629,073 B1* | 9/2003 | Hon et al. | 704/256.4 |
| 7,003,460 B1* | 2/2006 | Bub et al. | 704/256 |
| 7,216,077 B1* | 5/2007 | Padmanabhan et al. | 704/240 |
| 7,487,091 B2* | 2/2009 | Miyazaki | 704/255 |
| 7,565,282 B2* | 7/2009 | Carus et al. | 704/9 |
| 7,603,276 B2* | 10/2009 | Yoshizawa | 704/256.2 |
| 7,881,930 B2* | 2/2011 | Faisman et al. | 704/235 |
| 8,136,154 B2* | 3/2012 | Phoha et al. | 726/19 |
| 8,301,449 B2* | 10/2012 | He et al. | 704/257 |
| 8,620,655 B2* | 12/2013 | Xu et al. | 704/236 |
| 2005/0131694 A1* | 6/2005 | Nishitani et al. | 704/256 |
| 2005/0203737 A1* | 9/2005 | Miyazaki | 704/240 |
| 2006/0100874 A1* | 5/2006 | Oblinger et al. | 704/256.3 |
| 2006/0136209 A1* | 6/2006 | Menendez-Pidal et al. | 704/254 |
| 2006/0230140 A1* | 10/2006 | Aoyama et al. | 709/224 |
| 2008/0091424 A1* | 4/2008 | He et al. | 704/240 |
| 2008/0319743 A1* | 12/2008 | Faisman et al. | 704/235 |
| 2010/0198577 A1* | 8/2010 | Chen et al. | 704/2 |

OTHER PUBLICATIONS

Kuldip K Paliwal and Bishnu S Atal, "Efficient vector quantization of lpc parameters at 24 bits/frame," Speech and Audio Processing, IEEE Transactions on, vol. 1, No. 1, pp. 3-14, 1993.

Yannis Stylianou and Eric Moulines, "Continuous probabilistic transform for voice conversion," IEEE Transactions on Speech and Audio Processing, vol. 6, pp. 131-142, 1998.

W Bastiaan Kleijn and Kuldip K Paliwal, Speech coding and synthesis, Elsevier Science Inc., 1995.

Hui Ye and Steve Young, "Perceptually weighted linear transformations for voice conversion," in Proc. of the Eurospeech'03, 2003.

Vassilis D Diakoloukas and Vassilios V Digalakis, "Maximum-likelihood stochastic-transformation adaptation of hidden markov models," Speech and Audio Processing, IEEE Transactions on, vol. 7, No. 2, pp. 177-187, 1999.

Keiichi Tokuda, Heiga Zen, and Alan W Black, "An hmm-based speech synthesis system applied to english," in Speech Synthesis, 2002. Proceedings of 2002 IEEE Workshop on. IEEE, 2002, pp. 227-230.

Daniel Erro and Asunci'on Moreno, "Frame alignment method for cross-lingual voice conversion," in Interspeech, 2007.

Kenneth Rose, "Deterministic annealing for clustering, compression, classification, regression, and related optimization problems," Proceedings of the IEEE, vol. 86, No. 11, pp. 2210-2239, 1998.

Michael Pitz, Sirko Molau, Ralf Schlüter, and Hermann Ney, "Vocal tract normalization equals linear transformation in cepstral space," in Proc. EuroSpeech2001, 2001.

Sankaran Panchapagesan and Abeer Alwan, "Frequency warping for vtln and speaker adaptation by linear transformation of standard mfcc," Computer speech & language, vol. 23, No. 1, pp. 42-64, 2009.

Yannis Stylianou, "Applying the harmonic plus noise model in concatenative speech synthesis," Speech and Audio Processing, IEEE Transactions on, vol. 9, No. 1, pp. 21-29, 2001.

Hideki Kawahara, "Straight, exploitation of the other aspect of vocoder: Perceptually isomorphic decomposition of speech sounds," Acoustical science and technology, vol. 27, No. 6, pp. 349-353, 2006.

Daniel Erro Eslava, "Intra-lingual and cross-lingual voice conversion using harmonic plus stochastic models," Barcelona, Spain: PhD Thesis, Universitat Politechnica de Catalunya, 2008.

Shrikanth Narayanan and Dagen Wang, "Speech rate estimation via temporal correlation and selected sub-band correlation," in Proc. of the IEEE Int. Conf. on Acoustics, Speech, and Signal Processing (ICASSP). Citeseer, 2005.

CJ Leggetter and PC Woodland, "Maximum likelihood linear regression for speaker adaptation of continuous density hidden markov models," Computer speech and language, vol. 9, No. 2, pp. 171, 1995.

Mark JF Gales and PC Woodland, "Mean and variance adaptation within the mllr framework," Computer Speech and Language, vol. 10, No. 4, pp. 249-264, 1996.

Junichi Yamagishi, "Average-voice-based speech synthesis," Tokyo Institute of Technology, 2006.

Mikiko Mashimo, Tomoki Toda, Kiyohiro Shikano, and Nick Campbell, "Evaluation of crosslanguage voice conversion based on gmm and straight," 2001.

Alexander Kain and Michael W Macon, "Spectral voice conversion for text-to-speech synthesis," in Acoustics, Speech and Signal Processing, 1998. Proceedings of the 1998 IEEE International Conference on. IEEE, 1998, vol. 1, pp. 285-288.

Daisuke Saito, ShinjiWatanabe, Atsushi Nakamura, and Nobuaki Minematsu, "Statistical voice conversion based on noisy channel model," Audio, Speech, and Language Processing, IEEE Transactions on, vol. 20, No. 6, pp. 1784-1794, 2012.

David Sundermann, Antonio Bonafonte, Hermann Ney, and Harald Hoge, "A first step towards text-independent voice conversion," in Proc. of the ICSLP'04, 2004.

Arun Kumar and Ashish Verma, "Using phone and diphone based acoustic models for voice conversion: a step towards creating voice fonts," in Multimedia and Expo, 2003. ICME'03. Proceedings. 2003 International Conference on. IEEE, 2003, vol. 1, pp. I-393.

Vassilios V Digalakis, Dimitry Rtischev, and Leonardo G Neumeyer, "Speaker adaptation using constrained estimation of gaussian mixtures," Speech and Audio Processing, IEEE Transactions on, vol. 3, No. 5, pp. 357-366, 1995.

Masatsune Tamura, Takashi Masuko, Keiichi Tokuda, and Takao Kobayashi, "Adaptation of pitch and spectrum for hmm-based speech synthesis using mllr," in Acoustics, Speech, and Signal Processing, 2001. Proceedings.(ICASSP'01). 2001 IEEE International Conference on. IEEE, 2001, vol. 2, pp. 805-808.

M-W Feng, Richard Schwartz, Francis Kubala, and John Makhoul, "Iterative normalization for speaker-adaptive training in continuous speech recognition," in Acoustics, Speech, and Signal Processing, 1989. ICASSP-89., 1989 International Conference on. IEEE, 1989, pp. 612-615.

H Valbret, E Moulines, and Jean-Pierre Tubach, "Voice transformation using psola technique," Speech Communication, vol. 11, No. 2, pp. 175-187, 1992.

Daniel Erro, Inaki Sainz, Eva Navas, and Inma Hern'aez, "Improved hnm-based vocoder for statistical synthesizers," in Proc. Interspeech, 2011, pp. 1809-1812.

Yamato Ohtani, Tomoki Toda, Hiroshi Saruwatari, and Kiyohiro Shikano, "Maximum likelihood voice conversion based on gmm with straight mixed excitation," in Proc. ICSLP, 2006, pp. 2266-2269.

R Faltlhauser, T Pfau, and G Ruske, "On-line speaking rate estimation using gaussian mixture models," in Acoustics, Speech, and Signal Processing, 2000. ICASSP'00. Proceedings. 2000 IEEE International Conference on. IEEE, 2000, vol. 3, pp. 1355-1358.

Daniel Erro, Asunci'on Moreno, and Antonio Bonafonte, "Inca algorithm for training voice conversion systems from nonparallel corpora," Audio, Speech, and Language Processing, IEEE Transactions on, vol. 18, No. 5, pp. 944-953, 2010.

Athanasios Mouchtaris, Jan Van der Spiegel, and Paul Mueller, "Non-parallel training for voice conversion by maximum likelihood constrained adaptation," in Acoustics, Speech, and Signal Processing, 2004. Proceedings.(ICASSP'04). IEEE International Conference on. IEEE, 2004, vol. 1, pp. I-1.

Heiga Zen, Keiichi Tokuda, and Alan W Black, "Statistical parametric speech synthesis," Speech Communication, vol. 51, No. 11, pp. 1039-1064, 2009.

Junichi Yamagishi, Takashi Nose, Heiga Zen, Zhen-Hua Ling, Tomoki Toda, Keiichi Tokuda, Simon King, and Steve Renals, "Robust speaker-adaptive hmm-based text-to-speech synthesis," Audio, Speech, and Language Processing, IEEE Transactions on, vol. 17, no. 6, pp. 1208-1230, 2009.

Yi-Jian Wu, Yoshihiko Nankaku, and Keiichi Tokuda, "State mapping based method for cross-lingual speaker adaptation in hmm-based speech synthesis," in Proc. of Interspeech, 2009, pp. 528-531.

Robert J McAulay and Thomas F Quatieri, "Computationally efficient sine-wave synthesis and its application to sinusoidal transform coding," in Acoustics, Speech, and Signal Processing, 1988. ICASSP-88., 1988 International Conference on. IEEE, 1988, pp. 370-373.

(56) References Cited

OTHER PUBLICATIONS

Xianglin Peng, Keiichiro Oura, Yoshihiko Nankaku, and Keiichi Tokuda, "Cross-lingual speaker adaptation for hmm-based speech synthesis considering differences between language-dependent average voices," in Signal Processing (ICSP), 2010 IEEE 10th International Conference on. IEEE, 2010, pp. 605-608.

Junichi Yamagishi, "Average-Voice-Based Speech Synthesis" PhD Thesis, 2006.

Junichi Yamagishi, Bela Usabaev, Simon King, Oliver Watts, John Dines, Jilei Tian, Rile Hu, Keiichiro Oura, Keiichi Tokuda, Reima Karhila, Mikko Kurimo, "Thousands of Voices for HMM-based Speech Synthesis," Interspeech 2009, 10th Annual Conference of the International Speech Communication Association, Brighton, United Kingdom, Sep. 6-10, 2009.

Vincent Wan, Javier Latorre, Kayoko Yanagisawa, Norbert Braunschweller, Langzhou Chen, Mark J. F. Gales, and Masami Akamine, "Building HMM-TTS Voices on Diverse Data," IEEE Journal of Selected Topics in Signal Processing, vol. 8, No. 2, Apr. 2014, pp. 296-306.

Junichi Yamagishi, Oliver Watts, Simon King, Bela Usabaev, "Roles of the Average Voice in Speaker-adaptive HMM-based Speech Synthesis," INTERSPEECH 2010, Sep. 26-30, 2010, Makuhari, Chiba, Japan, pp. 418-421.

Alan W Black, Heiga Zen, and Keichi Tokuda, "Statistical Parametric Speech Synthesis," ICASSP 2007, pp. IV-1229-IV-1232.

* cited by examiner

METHOD AND SYSTEM FOR CROSS-LINGUAL VOICE CONVERSION

BACKGROUND

Unless otherwise indicated herein, the materials described in this section are not prior art to the claims in this application and are not admitted to be prior art by inclusion in this section.

A goal of automatic speech recognition (ASR) technology is to map a particular utterance to an accurate textual representation, or other symbolic representation, of that utterance. For instance, ASR performed on the utterance "my dog has fleas" would ideally be mapped to the text string "my dog has fleas," rather than the nonsensical text string "my dog has freeze," or the reasonably sensible but inaccurate text string "my bog has trees."

A goal of speech synthesis technology is to convert written language into speech that can be output in an audio format, for example directly or stored as an audio file suitable for audio output. The written language could take the form of text, or symbolic linguistic representations. The speech may be generated as a waveform by a speech synthesizer, which produces artificial human speech. Natural sounding human speech may also be a goal of a speech synthesis system.

Various technologies, including computers, network servers, telephones, and personal digital assistants (PDAs), can be employed to implement an ASR system and/or a speech synthesis system, or one or more components of such systems. Communication networks may in turn provide communication paths and links between some or all of such devices, supporting speech synthesis system capabilities and services that may utilize ASR and/or speech synthesis system capabilities.

BRIEF SUMMARY

In one aspect, an example embodiment presented herein provides a method comprising: training an output hidden Markov model (HMM) based speech features generator implemented by one or more processors of a system using speech signals of an output speaker speaking an output language, wherein the output HMM based speech features generator comprises a first configuration of output HMM state models, each of the output HMM state models having a set of generator-model functions; training an auxiliary HMM based speech features generator implemented by one or more processors of the system using speech signals of an auxiliary speaker speaking an input language, wherein the auxiliary HMM based speech features generator comprises a second configuration of auxiliary HMM state models, each of the auxiliary HMM state models having a set of generator-model functions; for each given output HMM state model of the first configuration, determining a particular set of generator-model functions from among the auxiliary HMM state models of the second configuration that most closely matches the set of generator-model functions of the given output HMM; determining a fundamental frequency (F0) transform that speech-adapts F0 statistics of the output HMM based speech features generator to match F0 statistics of the auxiliary HMM based speech features generator; determining a duration transform that speech-adapts duration statistics of the output HMM based speech features generator to match duration statistics of the auxiliary HMM based speech features generator; constructing a chimaera HMM based speech features generator implemented by one or more processors of the system to be the same as the output HMM based speech features generator, but wherein the set of generator-model functions of each output HMM state model of the chimaera HMM based speech features generator is replaced with the determined particular most closely matching set of generator-model functions; and speech-adapting F0 statistics and duration statistics of the chimaera HMM based speech features generator using the F0 transform and duration transform, respectively.

In another aspect, an example embodiment presented herein provides a method comprising: implementing an output hidden Markov model (HMM) based speech features generator by one or more processors of a system, wherein the output HMM based speech features generator comprises a first configuration of output HMM state models, each of the output HMM state models having a set of generator-model functions, and wherein the implemented output HMM based speech features generator is trained using speech signals of an output speaker speaking an output language; implementing an auxiliary HMM based speech features generator by one or more processors of the system, wherein the auxiliary HMM based speech features generator comprises a second configuration of auxiliary HMM state models, each of the auxiliary HMM state models having a set of generator-model functions, and wherein the implemented auxiliary HMM based speech features generator is trained using speech signals of an auxiliary speaker speaking an input language; implementing a chimaera HMM based speech features generator that is the same as the output HMM based speech features generator, but wherein (i) the set of generator-model functions of each given output HMM state model of the chimaera HMM based speech features generator is replaced with a particular set of generator-model functions from among the auxiliary HMM state models of the second configuration that most closely matches the set of generator-model functions of the given output HMM, (ii) fundamental frequency (F0) statistics of the chimaera HMM based speech features generator are speech-adapted using an F0 transform that speech-adapts F0 statistics of the output HMM based speech features generator to match F0 statistics of the auxiliary HMM based speech features generator, and (iii) duration statistics of the chimaera HMM based speech features generator are speech-adapted using a duration transform that speech-adapts duration statistics of the output HMM based speech features generator to match duration statistics of the auxiliary HMM based speech features generator; determining speech-adaptation transforms that speech-adapt the auxiliary HMM based speech features generator to speech signals of an input speaker speaking the input language; at an input device of the system, receiving a run-time utterance of the input speaker speaking the input language; generating an enriched transcription in the output language of the received run-time utterance; speech-adapting the output HMM state models of the chimaera HMM based speech features generator using the determined speech-adaptation transforms to thereby produce a speech-adapted chimaera HMM based speech features generator; and synthesizing speech in the output language, using the speech-adapted chimaera HMM based speech features generator to generate voice-converted speech features in the output language from the enriched transcription so that the synthesized speech has voice characteristics of the input speaker.

In still another respect, an example embodiment presented herein provides a system comprising: one or more processors; memory; and machine-readable instructions stored in the memory, that upon execution by the one or more processors cause the system to carry out functions including: implementing an output hidden Markov model (HMM) based speech features generator, wherein the output HMM based speech features generator comprises a first configuration of output HMM state models, each of the output HMM state models having a set of generator-model functions, and wherein the implemented output HMM based speech features generator is trained using speech signals of an output speaker speaking an output language; implementing an auxiliary HMM based speech features generator, wherein the auxiliary HMM based speech features generator comprises a second configuration of auxiliary HMM state models, each of the auxiliary HMM state models having a set of generator-model functions, and wherein the implemented auxiliary HMM based speech features generator is trained using speech signals of an auxiliary speaker speaking an input language; implementing a chimaera HMM based speech features generator that is the same as the output HMM based speech features generator, but wherein (i) the set of generator-model functions of each given output HMM state model of the chimaera HMM based speech features generator is replaced with a particular set of generator-model functions from among the auxiliary HMM state models of the second configuration that most closely matches the set of generator-model functions of the given output HMM, (ii) fundamental frequency (F0) statistics of the chimaera HMM based speech features generator are speech-adapted using an F0 transform that speech-adapts F0 statistics of the output HMM based speech features generator to match F0 statistics of the auxiliary HMM based speech features generator, and (iii) duration statistics of the chimaera HMM based speech features generator are speech-adapted using a duration transform that speech-adapts duration statistics of the output HMM based speech features generator to match duration statistics of the auxiliary HMM based speech features generator.

In yet another aspect, an example embodiment presented herein provides an article of manufacture including a computer-readable storage medium having stored thereon program instructions that, upon execution by one or more processors of a system, cause the system to perform operations comprising: implementing an output hidden Markov model (HMM) based speech features generator, wherein the output HMM based speech features generator comprises a first configuration of output HMM state models, each of the output HMM state models having a set of generator-model functions, and wherein the implemented output HMM based speech features generator is trained using speech signals of an output speaker speaking an output language; implementing an auxiliary HMM based speech features generator, wherein the auxiliary HMM based speech features generator comprises a second configuration of auxiliary HMM state models, each of the auxiliary HMM state models having a set of generator-model functions, and wherein the implemented auxiliary HMM based speech features generator is trained using speech signals of an auxiliary speaker speaking an input language; implementing a chimaera HMM based speech features generator that is the same as the output HMM based speech features generator, but wherein (i) the set of generator-model functions of each given output HMM state model of the chimaera HMM based speech features generator is replaced with a particular set of generator-model functions from among the auxiliary HMM state models of the second configuration that most closely matches the set of generator-model functions of the given output HMM, (ii) fundamental frequency (F0) statistics of the chimaera HMM based speech features generator are speech-adapted using an F0 transform that speech-adapts F0 statistics of the output HMM based speech features generator to match F0 statistics of the auxiliary HMM based speech features generator, and (iii) duration statistics of the chimaera HMM based speech features generator are speech-adapted using a duration transform that speech-adapts duration statistics of the output HMM based speech features generator to match duration statistics of the auxiliary HMM based speech features generator.

In yet a further aspect, an example embodiment presented herein provides an article of manufacture including a computer-readable storage medium, having stored thereon program instructions that, upon execution by one or more processors of a system, cause the system to perform operations comprising: training an output hidden Markov model (HMM) based speech features generator using speech signals of an output speaker speaking an output language, wherein the output HMM based speech features generator comprises a first configuration of output HMM state models, each of the output HMM state models having a set of generator-model functions; training an auxiliary HMM based speech features generator using speech signals of an auxiliary speaker speaking an input language, wherein the auxiliary HMM based speech features generator comprises a second configuration of auxiliary HMM state models, each of the auxiliary HMM state models having a set of generator-model functions; for each given output HMM state model of the first configuration, determining a particular set of generator-model functions from among the auxiliary HMM state models of the second configuration that most closely matches the set of generator-model functions of the given output HMM; determining a fundamental frequency (F0) transform that speech-adapts F0 statistics of the output HMM based speech features generator to match F0 statistics of the auxiliary HMM based speech features generator; determining a duration transform that speech-adapts duration statistics of the output HMM based speech features generator to match duration statistics of the auxiliary HMM based speech features generator; constructing a chimaera HMM based speech features generator implemented by one or more processors of the system to be the same as the output HMM based speech features generator, but wherein the set of generator-model functions of each output HMM state model of the chimaera HMM based speech features generator is replaced with the determined particular most closely matching set of generator-model functions; and speech-adapting F0 statistics and duration statistics of the chimaera HMM based speech features generator using the F0 transform and duration transform, respectively.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

1. Overview

Figure 1:
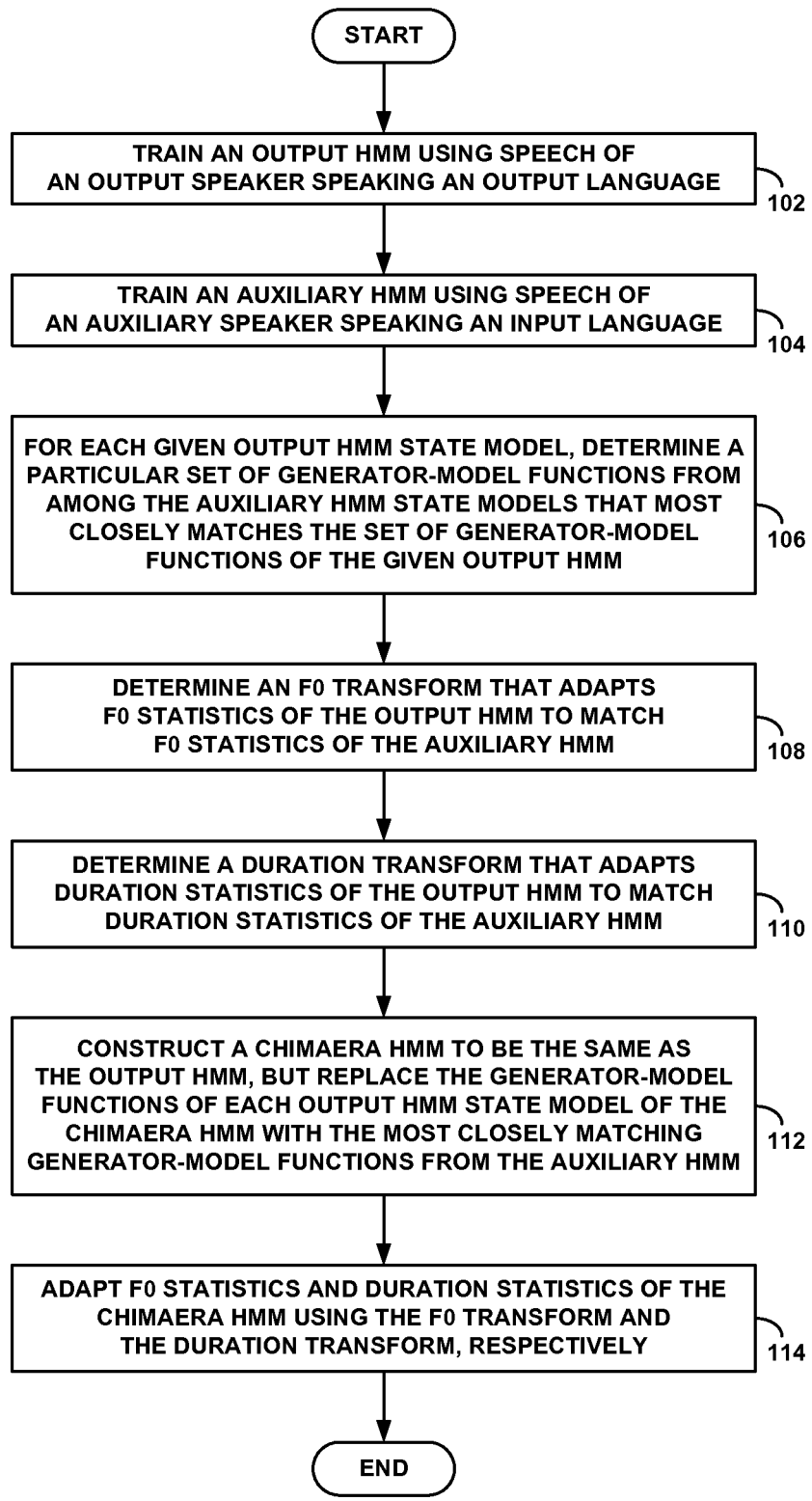
FIG. 1 is a flowchart illustrating an example method in accordance with an example embodiment.

A Speech-to-Speech (S2S) system can be a processor-based system configured to recognize speech of an input speaker in an input language, translate the recognized speech into a different, output language, and output the translated speech in the output language, in a synthesized voice for example. Such a S2S translation system can be configured to translate in both directions between pairs of languages, enabling verbal communication between people who speak different languages of a pair but otherwise have little or no knowledge of, or ability to speak, each other's language. Even in just one translation direction, a S2S translation can provide useful uni-directional, cross-lingual verbal communications. Other applications are possible as well. A S2S language translation system may operate by recognizing input speech in an input language, converting the input speech into a form suitable for language translation (e.g., text), translating the converted input into a textual form in an output language, converting the translated text into a form suitable for speech synthesis in the output language, and generating audio output of the translated speech as synthesized speech in the output language.

Functional elements of a S2S translation system may include an automatic speech recognition (ASR) subsystem, a language translation subsystem, and a text-to-speech (TTS) subsystem. An ASR subsystem can be used for receiving input speech in an input language, analytically decomposing the input speech into speech components that characterize elemental acoustic content and properties of the input language, and generating a textual version of the input speech from the particular speech components that, as determined by the ASR function, make up the input speech. A language translation subsystem may utilize statistical-machine-translation functions to translate the textual version of the input speech into a textual version of the speech translated into an output language. A TTS subsystem trained in the output language may then generate synthesized speech of the translated textual version in the output language.

Operationally, a S2S translation system can be seen as performing linguistic functions of language translation between an input and an output language, and acoustic functions of voice conversion between an input speaker and a synthesized output voice. To some extent, language translation and voice conversion can be separated. In particular, voice conversion may be an aspect deserving of focused attention in a S2S translation system because, for among other reasons, it can be desirable in some applications for a synthesized output voice to sound like the voice of the input speaker. For example, in a bi-directional, cross-lingual conversation, the ability to synthesize an output voice with characteristics of an input speaker can help facilitate a more natural flow of the conversation. In the context of S2S translation, the conversion of an input voice to an output voice is referred to as "cross-lingual voice conversion," and the quality with which it can be achieved may be among the criteria used in rating the overall quality and effectiveness of a S2S translation system.

Technical considerations involved in attaining good and/or high quality, cross-lingual voice conversion can be both theoretical and practical in nature. Theoretical considerations relate generally to derivation and formulation of mathematical and analytical techniques that provide the theoretical foundations of speech recognition, voice conversion, and speech synthesis technologies. Practical considerations relate generally to designs and architectures of systems and subsystems for implementing techniques and algorithms that derive from the theoretical foundations.

One notable consideration of cross-lingual voice conversion, mainly theoretical in nature, is quality. In particular, the quality of cross-lingual voice conversion may be viewed as having two basic dimensions: voice conversion quality and speech quality. The former describes how convincing the transformation is, while the latter describes the quality of the synthesized speech. Speech quality can itself be broken down to two characteristic components: "naturalness," which describes how natural synthesized speech sounds; and "intelligibility," which evaluates the ability of synthesized speech to convey the linguistic content. Of the two characteristic components of speech quality, naturalness has generally proven to be a more elusive goal, and achieving it is therefore afforded attention herein, together with achieving conversion quality.

A notable consideration in the practical implementation of cross-lingual voice conversion technologies is that of scalability. Scalability can be viewed in terms of at least two fundamental factors: maintenance cost and run-time cost. Maintenance cost is the cost to develop and maintain a system that can scale up to many 1000s of users. For example, a system that supports 10 million users each making 50 queries per month for translations between two languages per user can have storage costs for holding millions of transforms and run-time costs of handling millions of translation queries per month.

Example embodiments of a method and system described herein are aimed at achieving natural sounding cross-lingual voice conversion with high conversion quality in a manner that also addresses issues of scalability. More specifically, an approach is devised that uses a hidden Markov model (HMM)-based ASR subsystem for receiving speech in an input language, a HMM-based TTS subsystem for outputting translated speech in an output language, and an optimized form of voice-conversion mapping between the HMM of the ASR subsystem and the HMM of the TTS subsystem that causes the synthesized output voice, in the output language, to sound like the input voice. The particular considerations of naturalness and conversion quality are addressed by an application of new techniques for the voice-conversion mapping. The new techniques, described herein, also lend themselves to streamlined implementations that scale well with the number of input and output languages and the number of users.

In accordance with example embodiments, an HMM-based ASR subsystem for an input language may be trained using extensive input-language standard-voice recordings in an input language. This can amount to application of high-quality, proven training techniques, for example. Referring to the HMM of the ASR subsystem as an "auxiliary HMM" and the speaker source of the input-language standard-voice recordings as an "auxiliary speaker," this training process may be said to train the auxiliary HMM in the voice of the auxiliary speaker. As a result, the auxiliary HMM, which is structured to model the input language, acquires a set of Gaussian statistical generator functions that have been iteratively and cumulatively built based on voice characteristics the auxiliary speaker. The Gaussian generator functions of the auxiliary HMM correspond to probability density functions (PDFs) for jointly modeling spectral envelope parameters and excitation parameters of fundamental speech units of the input language. The fundamental speech units could be phonemes or triphones, for example.

Also in accordance with example embodiments, an HMM-based TTS subsystem for an output language may be trained using extensive output-language standard-voice recordings in an output language. This too can amount to application of high-quality, proven training techniques, for example. Referring to the HMM of the TTS subsystem as an "output HMM" and the speaker source of the output-language standard-voice recordings as an "output speaker," this training process may be said to train the output HMM in the voice of the output speaker. As a result, the output HMM, which is structured to model the output language, acquires a set of Gaussian statistical generator functions that have been iteratively and cumulatively built based on voice characteristics the output speaker. The Gaussian generator functions of the output HMM correspond to PDFs for jointly modeling spectral envelope parameters and excitation parameters of fundamental speech units of the output language. Again, the fundamental speech units could be phonemes or triphones, for example.

In further accordance with example embodiments, an analytical matching procedure may be carried out to identify for each Gaussian statistical generator function of the output HMM a closest match from among the Gaussian statistical generator functions of the auxiliary HMM. This process is enabled by a novel and effective "matching under transform" technique, and results in a set of Gaussian statistical generator functions fashioned from characteristics of the auxiliary voice that can be applied by the output HMM, which, as noted, is structured for modeling the output language. The matching under transform ("MUT") technique entails a matching procedure that can compensate for inter-speaker speech differences (e.g., differences between the output speaker and the auxiliary speaker). The matching procedure can be specified in terms of a MUT algorithm suitable for implementation as executable instructions on one or more processors of a system, such as a S2S system. Taken with additional steps described below, the effect can be to construct a speech synthesizer in the output language with voice characteristics of the auxiliary speaker.

As an additional aspect of matching, a transform that adapts statistics of fundamental frequency (F0) of the output HMM to the F0 statistics of the auxiliary HMM is computed. In the context of speech recognition and synthesis, F0 relates to the pitch of the voice. Similarly, a transform that adapts duration statistics of the output HMM to the duration statistics of the auxiliary HMM is also computed. In the context of speech recognition and synthesis, duration relates to the tempo of the speech and time durations of the fundamental speech units (e.g., phonemes and/or triphones) and/or time durations of HMM states used to model the fundamental speech units.

In a further aspect of example embodiments, a cross-lingual HMM, referred to herein as a "chimaera" HMM, is constructed by first creating a copy of the output HMM, such that the chimaera HMM initially has the Gaussian statistical generator functions of the output HMM. Next, the Gaussian statistical generator functions of the chimaera HMM, which are initially the same as those of the output HMM, are replaced with the Gaussian statistical generator functions of the auxiliary HMM identified using the matching under transform algorithm. Finally, the F0 and duration transformations are applied to the chimaera HMM. The chimaera HMM can now be considered as being configured to generate acoustic features of speech units of the output language, but characterized by the sound of the auxiliary voice.

In accordance with example embodiments, the chimaera HMM, prepared as described above, may be used at run-time in a speech synthesizer to synthesize speech in the output language, but with voice characteristics of a run-time input speaker speaking in the input language. More specifically, prior to run-time, a HMM-adaption technique may be used compute an input-speaker transform that adapts the auxiliary HMM to the recordings of the input speaker. Such input-speaker adaptation transforms may be derived from a relatively small number and/or variety of the input speaker recordings (small compared with the extent of recordings typically used in the sort of robust training applied to the auxiliary HMM or the output HMM). The input-speaker adaptation transforms can provide a basis for adapting the voice of the auxiliary speaker to that of the input speaker.

To apply the chimaera HMM at run-time in the example S2S system, the input-speaker adaptation transform may be applied to the Gaussian statistical generator functions of the chimaera HMM at run-time. The result is to adapt the chimaera HMM, which is structured to generate acoustic features in the output language, to the voice of the input speaker. When the input speaker speaks, the input speech is converted to text, translated to the output language, and transformed into synthesized speech in the output language. The chimaera HMM performs voice conversion that causes the output voice in the output language to sound like the voice of the input speaker.

Because the auxiliary HMM and the output HMM of example embodiments can both be constructed and trained independently in their respective languages, proven techniques together with extensive single-language, standard-voice recordings can be used to configure both HMMs. This convenience of HMM configuration applies for any pair of languages for which a S2S system may be constructed, and is one of the aspects of the example embodiments that makes them highly scalable. But additionally, the incorporation of robust, independently-constructed, single-language HMMs in the example embodiments is enabled by the introduction of the chimaera HMM for voice conversion, and the matching under transform technique that makes high-quality voice conversion mapping practical to implement. A chimaera HMM can be automatically constructed offline for each pair of input-output languages, yielding a further efficiency gain. And for any given input speaker (e.g., a user), a relatively small number of initial voice recordings may be used to compute an input-speaker adaptation transform that can be reused any time the input speaker subsequently invokes the S2S system.

2. Example Methods

In example embodiments, a S2S system may include one or more processors, one or more forms of memory, one or more input devices/interfaces, one or more output devices/interfaces, and machine-readable instructions that when executed by the one or more processors cause the S2S system to carry out the various functions and tasks described herein. The S2S system may also include implementations based on one or more hidden Markov models. In particular, the S2S system may employ methods that incorporate HMM-based speech recognition, HMM-based speech synthesis, and HMM-based voice conversion, as well as other possible components. Two examples of such a method are described in the current section.

FIG. 1 is a flowchart illustrating an example method in accordance with example embodiments. At step 102, an output HMM based speech features generator, implemented by one or more processors of the system, is trained using speech signals of an output speaker speaking an output language. Speech features generated by the output HMM-based speech features generator may be used for synthesis of speech in the output language. More particularly, speech features generally include quantitative measures of acoustic properties of speech that may be processed, for example by a speech synthesizer apparatus, to produce synthesized speech. The output HMM based speech features generator may include a first configuration of output HMM state models, each of which has a set of generator-model functions. The output HMM state models are used to model states, and transitions between states, of phonetic units of the output language. The set of generator-model functions for each output HMM state model specifies how speech features corresponding to the modeled phonetic unit of the output language are generated. The first configuration of output HMM state models is structured for modeling speech in the output language.

At step 104, an auxiliary hidden HMM based speech features generator, implemented by one or more processors of the system, is trained using speech signals of an auxiliary speaker speaking an input language. Speech features generated by the auxiliary HMM-based speech features generator may be used for synthesis of speech in the input language. More particularly, the auxiliary HMM based speech features generator may include a second configuration of auxiliary HMM state models, each of which has a set of generator-model functions. The auxiliary HMM state models are used to model states, and transitions between states, of phonetic units of the input language. The set of generator-model functions for each auxiliary HMM state model specifies how speech features corresponding to the modeled phonetic unit of the input language are generated. The second configuration of auxiliary HMM state models is structured for modeling speech in the input language.

At step 106, a procedure for matching generator-model functions of the output HMM state models and generator-model functions of the auxiliary HMM state models is carried out. Specifically, for each given output HMM state model of the first configuration, a particular set of generator-model functions from among the auxiliary HMM state models of the second configuration that most closely matches the set of generator-model functions of the given output HMM is determined. As described in more detail below, the matching is determined using a procedure that simultaneously applies a parametric, transformation-based mapping from an analytic space of the output HMM state models to an analytic space of the auxiliary HMM state models, and a nonparametric, probabilistic-associative mapping from the analytic space of the auxiliary HMM state models to the analytic space of the output HMM state models. Referred to herein as "matching under transform" ("MUT"), the matching procedure can compensate for differences between speech (e.g., voice) of the output speaker and speech (e.g., voice) of the auxiliary speaker.

At step 108, a fundamental frequency (F0) transform that speech-adapts F0 statistics of the output HMM based speech features generator to match F0 statistics of the auxiliary HMM based speech features generator is determined.

At step 110, a duration transform that speech-adapts duration statistics of the output HMM based speech features generator to match duration statistics of the auxiliary HMM based speech features generator is determined.

At step 112, a "chimaera" HMM based speech features generator is constructed for mapping between the auxiliary HMM based speech features generator and the output HMM based speech features generator. More particularly, the chimaera HMM based speech features generator, also implemented by one or more processors of the system, is constructed to initially be the same as the output HMM based speech features generator. Thus, the chimaera HMM base speech features generator initially has the output HMM state models and generator-model functions of the output HMM based speech features generator. Then, the set of generator-model functions of each output HMM state model of the chimaera HMM based speech features generator is replaced with the particular most closely matching set of generator-model functions, as determined at step 106.

Finally, at step 114, the F0 statistics of the chimaera HMM based speech features generator are speech-adapted using the F0 transform determined at step 108, and the duration statistics of the chimaera HMM based speech features generator are speech-adapted using the duration transform duration transform determined at step 110.

In accordance with example embodiments, the output HMM based speech features generator, the auxiliary HMM based speech features generator, and the chimaera HMM based speech features generator could all be implemented by at least one common processor from among the one or more processors of the system. For example, all three HMM based speech features generators could be implemented by a single, common processor. Alternatively, one or more of the three could be implemented in a distributed fashion, such that all three share at least one common processor. As still a further alternative, one or more of the three could be implemented such that it shares no processor with the others. Other implementation of the three HMM based speech features generators among configurations of the one or more processors of the system are possible as well.

In accordance with example embodiments, the S2S system may be configured for run-time voice conversion of an input speaker by further transformation and adaptation of the chimaera HMM based speech features generator. Specifically, speech signals of an input speaker speaking the input language may be used to determine speech-adaptation transforms that speech-adapt the auxiliary HMM based speech features generator to the input speaker. For example, one or more HMM-adaptation techniques may be used to compute a transform that adapts the auxiliary HMM based speech features generator to the voice recordings of the input speaker. By way of example, the techniques could include maximum likelihood linear regression, constrained maximum likelihood linear regression, and corresponding techniques for HMM-based speech synthesis.

In further accordance with example embodiments, the S2S system may be used to carry out run-time voice conversion of the input speaker. More particularly, operating in a run-time mode, the S2S system could receive run-time input speech signals of the input speaker speaking the input language. This could be live, run-time speech of the input speaker, or recorded speech of the input speaker received at run-time. In a manner described below, the S2S system could generate an enriched transcription in the output language of the received run-time input speech signals, in preparation for synthesis of a translation of the input speech into the output language. As used herein, an enriched transcription is a symbolic representation of the phonetic and linguistic content of written text or other symbolic form of speech. It can take the form of a sequence of labels (or other text-based identifier), each label identifying a phonetic speech unit, such as a phoneme, and further identifying or encoding linguistic and/or syntactic context, temporal parameters, and other information for specifying how to render the symbolically-represented sounds as meaningful speech in a given language. The speech-adaptation transforms determined for the auxiliary HMM based speech features generator could then be applied to speech-adapt the output HMM state models of the chimaera HMM based speech features generator, thereby producing a speech-adapted chimaera HMM based speech features generator adapted to the input speaker's voice. Next, the speech-adapted chimaera HMM based speech features generator could be used to convert the enriched transcription into corresponding output speech features in the output language. Finally, a spoken utterance of the enriched transcription in the output language could be synthesized using the output speech features.

In still further accordance with example embodiments, generating the enriched transcription in the output language of the received run-time input speech signals could entail elements of speech-to-text conversion (e.g., ASR functionality), language translation, and text-to-speech conversion. More specifically, a speech recognition subsystem (or component) of the S2S system can be used to convert the received run-time input speech signals into text in the input language. A language translation subsystem (or component) could next translate the text from the input language to the output language. The translated text could then be converted into an enriched transcription in the output language as an initial operation of a TTS subsystem (or component) of the S2S system. The enriched transcription in the output language could include a concatenation of phonetic units of the output language, as well as indicia of linguistic context, and time durations, for example.

Taking the enriched transcription in the output language to be observed data, the chimaera HMM based speech features generator can be used to model speech features corresponding to the translated text. The modeled speech features can serve as input to a speech synthesizer, such a vocoder, in order to generate synthesized speech of the translated text. By preparing the chimaera HMM based speech features generator as described above, the synthesized output voice is made to sound like that of the input speaker. The effect is to translate the input speaker's speech in the input language to speech in the output language spoken as if with the input speaker's voice. Thus, in accordance with example embodiments, the input and output languages may be different. However, this need not be the case for all embodiments, and intra-lingual voice conversion, where the input and output languages are the same, can have useful applications as well.

In accordance with example embodiments, the set of generator-model functions for each given output HMM state model could include a multivariate spectral probability density function (PDF) for jointly modeling spectral envelope parameters of a phonetic unit of the output language modeled by a given output HMM state model, and a multivariate excitation PDF for jointly modeling excitation parameters of the phonetic unit of the output language. Similarly, the set of generator-model functions for each given auxiliary HMM state model could include a multivariate spectral PDF for jointly modeling spectral envelope parameters of a phonetic unit of the input language modeled by the given auxiliary HMM state model, and a multivariate excitation PDF for jointly modeling excitation parameters of the phonetic unit of the input language. By way of example, phonetic speech units could phonemes and/or triphones.

With generator-model functions defined as multivariate PDFs, the matching procedure of step 106 may be described in terms of finding pairs of multivariate PDFs which, in some sense, differ minimally. More specifically, making a determination of the set of generator-model functions of the auxiliary HMM state models of the second configuration that most closely matches the set of generator-model functions of a given output HMM could entail determining a multivariate spectral PDF from among the auxiliary HMM state models that is computationally nearest to the multivariate spectral PDF of the given output HMM state model in terms of a distance criterion that could be based on mean-squared-error (mse) or the Kullback-Leibler distance. The distance criterion that could be based on other metrics as well. Making the determination could additionally entail determining a multivariate excitation PDF from among the auxiliary HMM state models that is computationally nearest to the multivariate excitation PDF of the given output HMM state model in terms of a distance criterion that could be based on mse or the Kullback-Leibler distance.

In further accordance with example embodiments, determining the set of generator-model functions of the auxiliary HMM state models of the second configuration that most closely matches the set of generator-model functions of a given output HMM could entail making a determination an optimal correspondence between a multivariate PDF of the given output HMM and a particular multivariate PDF from among the auxiliary HMM state models. As mentioned above and discussed in more detail below, the determination could made under a transform that compensates for differences between speech of the output speaker and speech of the auxiliary speaker. That is, a matching under transform technique could be used to make an optimal matching determination.

In further accordance with example embodiments, the multivariate spectral PDF of each output HMM state model could have the mathematical form of a multivariate Gaussian function. Similarly, the multivariate spectral PDF of each auxiliary HMM state model could also have the mathematical form of a multivariate Gaussian function. While generator-model functions of HMMs can take the form of Gaussian PDFs, this is not necessarily a requirement.

In further accordance with example embodiments, the spectral envelope parameters of the phonetic units of the output language could be Mel Cepstral coefficients, Line Spectral Pairs, Linear Predictive coefficients, Mel-Generalized Cepstral Coefficients, or other acoustic-related quantities. In addition, the spectral envelope parameters of the phonetic units of the output language could also include first and second time derivatives of the acoustic-related quantities of the output language. Similarly, the spectral envelope parameters of the phonetic units of the input language could also be Mel Cepstral coefficients, Line Spectral Pairs, Linear Predictive coefficients, Mel-Generalized Cepstral Coefficients, or other acoustic-related quantities. Again, the spectral envelope parameters of the phonetic units of the input language could also include first and second time derivatives of the acoustic-related quantities of the input language.

In accordance with example embodiments, construction of the chimaera HMM based speech features generator at step 112 could entail transforming the output HMM based speech features generator into the chimaera HMM based speech features generator. More particularly, each output HMM state model of the output HMM based speech features generator could be replaced with the particular most closely matching set of generator-model functions, as determined at step 106. The F0 statistics and the duration statistics of the transformed output HMM based speech features generator could then be speech-adapted using the F0 transform and duration transform, as determined as steps 108 and 110, respectively. In this approach, the chimaera HMM based speech features generator can be viewed as being constructed "in place" from the output HMM based speech features generator.

Figure 2:
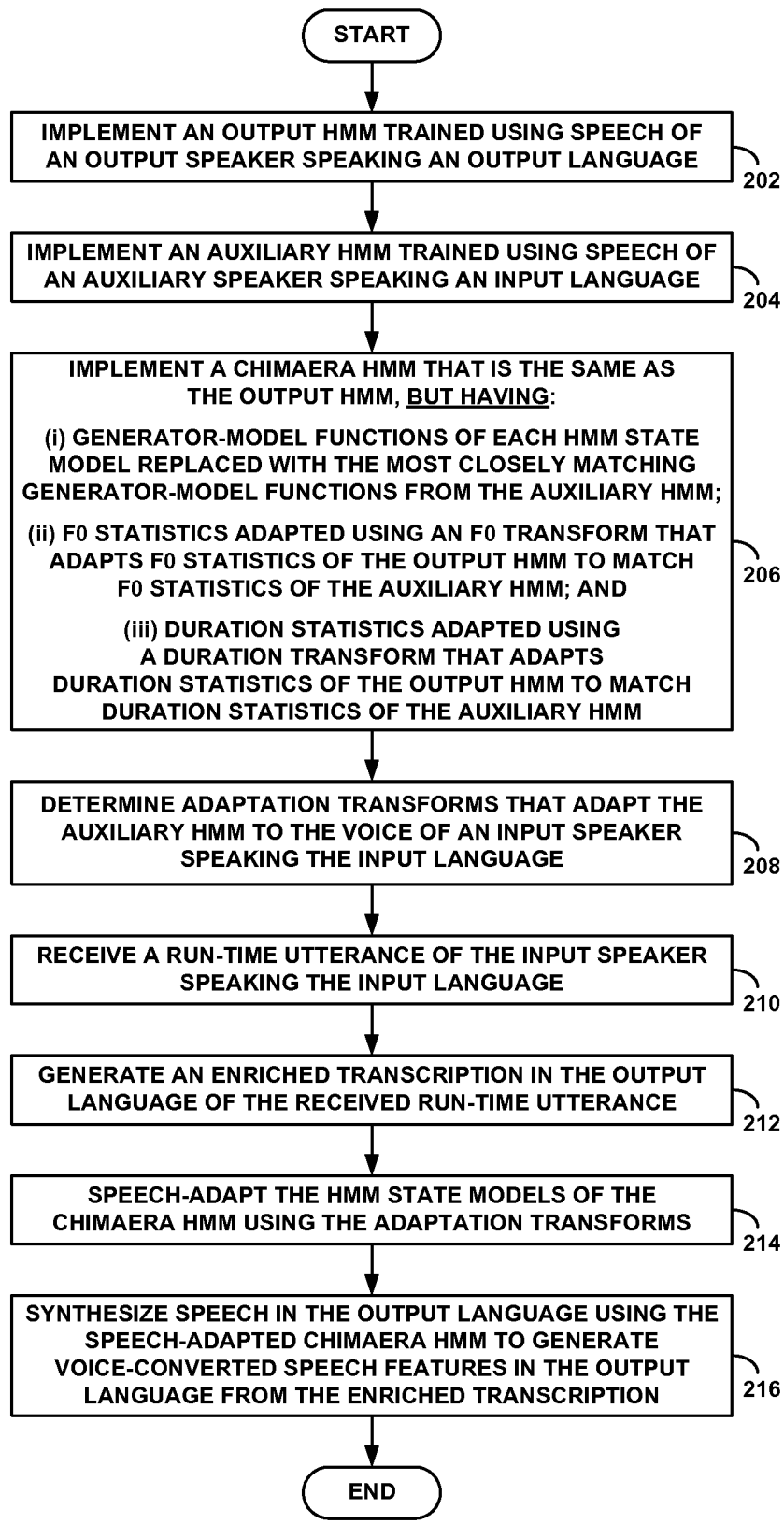
FIG. 2 is a flowchart illustrating an example method in accordance with another example embodiment.

FIG. 2 is a flowchart illustrating an example an alternative method in accordance with example embodiments. At step 202 an output HMM based speech features generator is implemented by one or more processors of a system. The implemented output HMM based speech features generator can include a first configuration of output HMM state models, and each of the output HMM state models may have a set of generator-model functions. Further, the implemented output HMM based speech features generator is trained using speech signals of an output speaker speaking an output language.

At step 204, an auxiliary HMM based speech features generator is implemented by one or more processors of the system. The implemented auxiliary HMM based speech features generator can include a second configuration of auxiliary HMM state models, and each of the auxiliary HMM state models may have a set of generator-model functions. Further, the implemented auxiliary HMM based speech features generator is trained using speech signals of an auxiliary speaker speaking an input language.

At step 206, a chimaera HMM based speech features generator is implemented that is the same as the output HMM based speech features generator, but with some specific differences. In particular, the set of generator-model functions of each given output HMM state model of the chimaera HMM based speech features generator is replaced with a particular set of generator-model functions from among the auxiliary HMM state models of the second configuration that most closely matches the set of generator-model functions of the given output HMM. In addition, fundamental frequency (F0) statistics of the chimaera HMM based speech features generator are speech-adapted using an F0 transform that speech-adapts F0 statistics of the output HMM based speech features generator to match F0 statistics of the auxiliary HMM based speech features generator. Still further, duration statistics of the chimaera HMM based speech features generator are speech-adapted using a duration transform that speech-adapts duration statistics of the output HMM based speech features generator to match duration statistics of the auxiliary HMM based speech features generator.

At step 208, speech signals of an input speaker speaking the input language may be used to determine speech-adaptation transforms that speech-adapt the auxiliary HMM based speech features generator to the input speaker.

At step 210, the S2S system could receive run-time input speech signals of the input speaker speaking the input language. This could be live, run-time speech of the input speaker, or recorded speech of the input speaker received at run-time. The input speech could be received at an input device of the system.

At step 212, the S2S could convert the received run-time input speech signals into an enriched transcription in the output language, in preparation for synthesis of a translation of the input speech into the output language.

At step 214, the speech-adaptation transforms determined at step 208 could be applied to speech-adapt the output HMM state models of the chimaera HMM based speech features generator, thereby producing a speech-adapted chimaera HMM based speech features generator adapted to the input speaker's voice.

Finally, at step 216, the speech-adapted chimaera HMM based speech features generator could be used to generate voice-converted speech features in the output language from the enriched transcription produced at step 212. A spoken utterance of the enriched transcription in the output language could be synthesized using the voice-converted speech features.

It will be appreciated that the steps shown in FIGS. 1 and 2 are meant to illustrate a methods in accordance with example embodiments. As such, various steps could be altered or modified, the ordering of certain steps could be changed, and additional steps could be added, while still achieving the overall desired operation.

3. Example Communication System and Device Architecture

Methods in accordance with an example embodiment, such as the on described above, devices, could be implemented using so-called "thin clients" and "cloud-based" server devices, as well as other types of client and server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

a. Example Communication System

Figure 3:
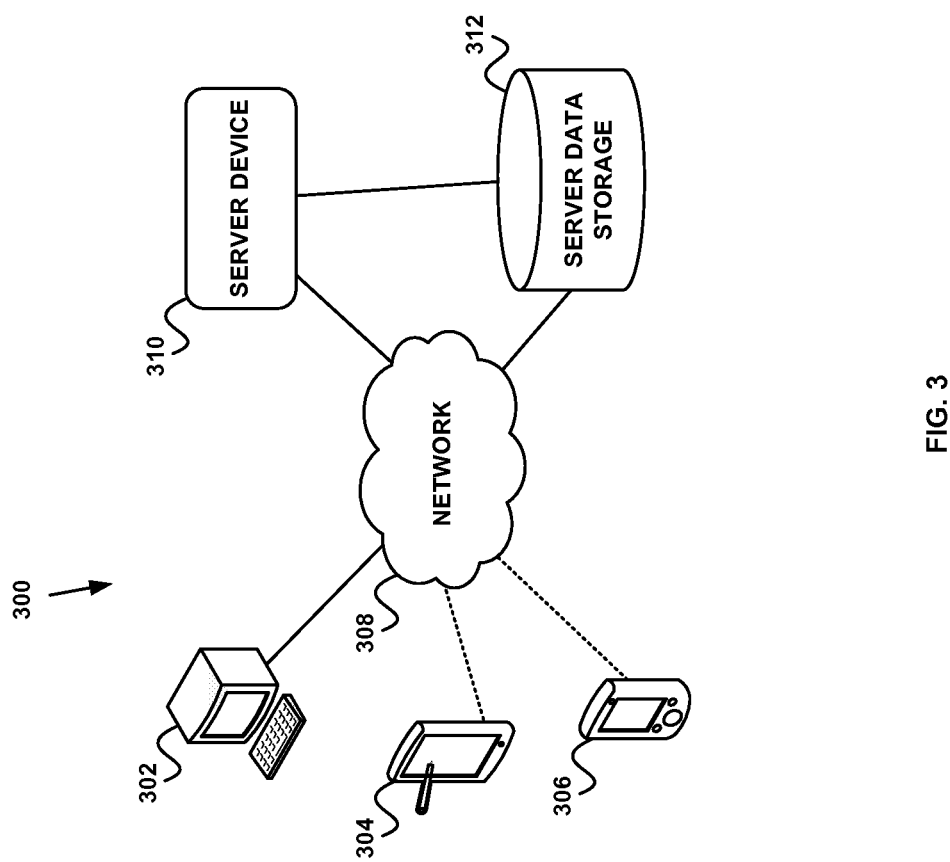
FIG. 3 is a block diagram of an example network and computing architecture, in accordance with an example embodiment.

FIG. 3 is a simplified block diagram of a communication system 300, in which various embodiments described herein can be employed. Communication system 300 includes client devices 302, 304, and 306, which represent a desktop personal computer (PC), a tablet computer, and a mobile phone, respectively. Client devices could also include wearable computing devices, such as head-mounted displays and/or augmented reality displays, for example. Each of these client devices may be able to communicate with other devices (including with each other) via a network 308 through the use of wireline connections (designated by solid lines) and/or wireless connections (designated by dashed lines).

Network 308 may be, for example, the Internet, or some other form of public or private Internet Protocol (IP) network. Thus, client devices 302, 304, and 306 may communicate using packet-switching technologies. Nonetheless, network 308 may also incorporate at least some circuit-switching technologies, and client devices 302, 304, and 306 may communicate via circuit switching alternatively or in addition to packet switching.

A server device 310 may also communicate via network 308. In particular, server device 310 may communicate with client devices 302, 304, and 306 according to one or more network protocols and/or application-level protocols to facilitate the use of network-based or cloud-based computing on these client devices. Server device 310 may include integrated data storage (e.g., memory, disk drives, etc.) and may also be able to access a separate server data storage 312. Communication between server device 310 and server data storage 312 may be direct, via network 308, or both direct and via network 308 as illustrated in FIG. 3. Server data storage 312 may store application data that is used to facilitate the operations of applications performed by client devices 302, 304, and 306 and server device 310.

Although only three client devices, one server device, and one server data storage are shown in FIG. 3, communication system 300 may include any number of each of these components. For instance, communication system 300 may comprise millions of client devices, thousands of server devices and/or thousands of server data storages. Furthermore, client devices may take on forms other than those in FIG. 3.

b. Example Server Device and Server System

Figure 4A:
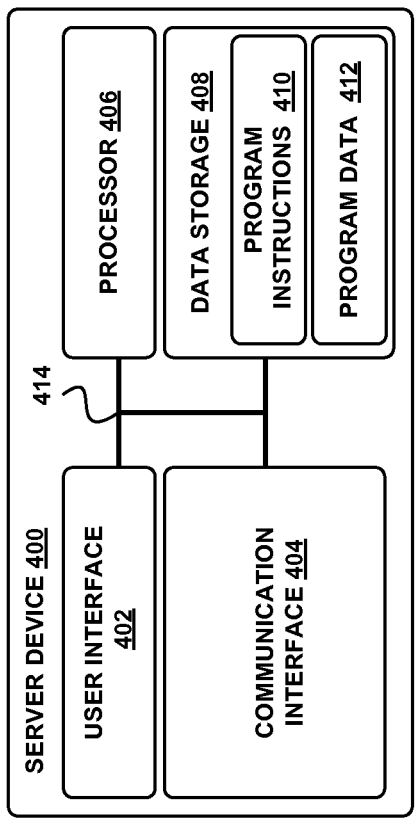
FIG. 4A is a block diagram of a server device, in accordance with an example embodiment.

FIG. 4A is a block diagram of a server device in accordance with an example embodiment. In particular, server device 400 shown in FIG. 4A can be configured to perform one or more functions of server device 310 and/or server data storage 312. Server device 400 may include a user interface 402, a communication interface 404, processor 406, and data storage 408, all of which may be linked together via a system bus, network, or other connection mechanism 414.

User interface 402 may comprise user input devices such as a keyboard, a keypad, a touch screen, a computer mouse, a track ball, a joystick, and/or other similar devices, now known or later developed. User interface 402 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 402 may be configured to generate audible output(s), via a speaker, speaker jack, audio output port, audio output device, earphones, and/or other similar devices, now known or later developed. In some embodiments, user interface 402 may include software, circuitry, or another form of logic that can transmit data to and/or receive data from external user input/output devices.

Communication interface 404 may include one or more wireless interfaces and/or wireline interfaces that are configurable to communicate via a network, such as network 308 shown in FIG. 3. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 404 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 406 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 406 may be configured to execute computer-readable program instructions 410 that are contained in data storage 408, and/or other instructions, to carry out various functions described herein.

Data storage 408 may include one or more non-transitory computer-readable storage media that can be read or accessed by processor 406. The one or more computer-readable storage media may include volatile and/or non-volatile storage components, such as optical, magnetic, organic or other memory or disc storage, which can be integrated in whole or in part with processor 406. In some embodiments, data storage 408 may be implemented using a single physical device (e.g., one optical, magnetic, organic or other memory or disc storage unit), while in other embodiments, data storage 408 may be implemented using two or more physical devices.

Data storage 408 may also include program data 412 that can be used by processor 406 to carry out functions described herein. In some embodiments, data storage 408 may include, or have access to, additional data storage components or devices (e.g., cluster data storages described below).

Referring again briefly to FIG. 3, server device 310 and server data storage device 312 may store applications and application data at one or more locales accessible via network 308. These locales may be data centers containing numerous servers and storage devices. The exact physical location, connectivity, and configuration of server device 310 and server data storage device 312 may be unknown and/or unimportant to client devices. Accordingly, server device 310 and server data storage device 312 may be referred to as "cloud-based" devices that are housed at various remote locations. One possible advantage of such "cloud-based" computing is to offload processing and data storage from client devices, thereby simplifying the design and requirements of these client devices.

In some embodiments, server device 310 and server data storage device 312 may be a single computing device residing in a single data center. In other embodiments, server device 310 and server data storage device 312 may include multiple computing devices in a data center, or even multiple computing devices in multiple data centers, where the data centers are located in diverse geographic locations. For example, FIG. 3 depicts each of server device 310 and server data storage device 312 potentially residing in a different physical location.

Figure 4B:
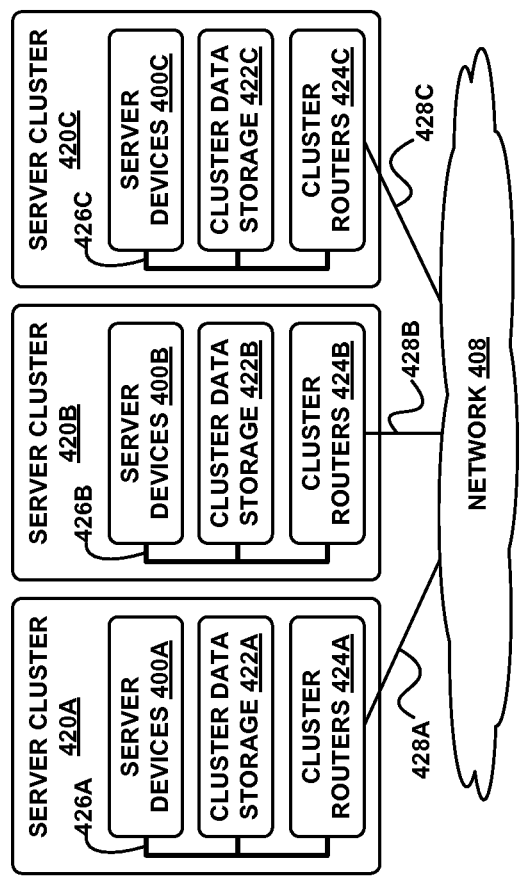
FIG. 4B depicts a cloud-based server system, in accordance with an example embodiment.

FIG. 4B depicts an example of a cloud-based server cluster. In FIG. 4B, functions of server device 310 and server data storage device 312 may be distributed among three server clusters 420A, 420B, and 420C. Server cluster 420A may include one or more server devices 400A, cluster data storage 422A, and cluster routers 424A connected by a local cluster network 426A. Similarly, server cluster 420B may include one or more server devices 400B, cluster data storage 422B, and cluster routers 424B connected by a local cluster network 426B. Likewise, server cluster 420C may include one or more server devices 300C, cluster data storage 422C, and cluster routers 424C connected by a local cluster network 426C. Server clusters 420A, 420B, and 420C may communicate with network 308 via communication links 428A, 428B, and 428C, respectively.

In some embodiments, each of the server clusters 420A, 420B, and 420C may have an equal number of server devices, an equal number of cluster data storages, and an equal number of cluster routers. In other embodiments, however, some or all of the server clusters 420A, 420B, and 420C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 420A, for example, server devices 400A can be configured to perform various computing tasks of a server, such as server device 310. In one embodiment, these computing tasks can be distributed among one or more of server devices 400A. Server devices 400B and 400C in server clusters 420B and 420C may be configured the same or similarly to server devices 400A in server cluster 420A. On the other hand, in some embodiments, server devices 400A, 400B, and 400C each may be configured to perform different functions. For example, server devices 400A may be configured to perform one or more functions of server device 310, and server devices 400B and server device 400C may be configured to perform functions of one or more other server devices. Similarly, the functions of server data storage device 312 can be dedicated to a single server cluster, or spread across multiple server clusters.

Cluster data storages 422A, 422B, and 422C of the server clusters 420A, 420B, and 320C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 310 and server data storage device 312 can be distributed across server clusters 420A, 420B, and 420C, various active portions and/or backup/redundant portions of these components can be distributed across cluster data storages 422A, 422B, and 422C. For example, some cluster data storages 422A, 422B, and 422C may be configured to store backup versions of data stored in other cluster data storages 422A, 422B, and 422C.

Cluster routers 424A, 424B, and 424C in server clusters 420A, 420B, and 420C, respectively, may include networking equipment configured to provide internal and external communications for the server clusters. For example, cluster routers 424A in server cluster 420A may include one or more packet-switching and/or routing devices configured to provide (i) network communications between server devices 400A and cluster data storage 422A via cluster network 426A, and/or (ii) network communications between the server cluster 420A and other devices via communication link 428A to network 408. Cluster routers 424B and 424C may include network equipment similar to cluster routers 424A, and cluster routers 424B and 424C may perform networking functions for server clusters 420B and 420C that cluster routers 424A perform for server cluster 420A.

Additionally, the configuration of cluster routers 424A, 424B, and 424C can be based at least in part on the data communication requirements of the server devices and cluster storage arrays, the data communications capabilities of the network equipment in the cluster routers 424A, 424B, and 424C, the latency and throughput of the local cluster networks 426A, 426B, 426C, the latency, throughput, and cost of the wide area network connections 428A, 428B, and 428C, and/or other factors that may contribute to the cost, speed, fault-tolerance, resiliency, efficiency and/or other design goals of the system architecture.

c. Example Client Device

Figure 5:
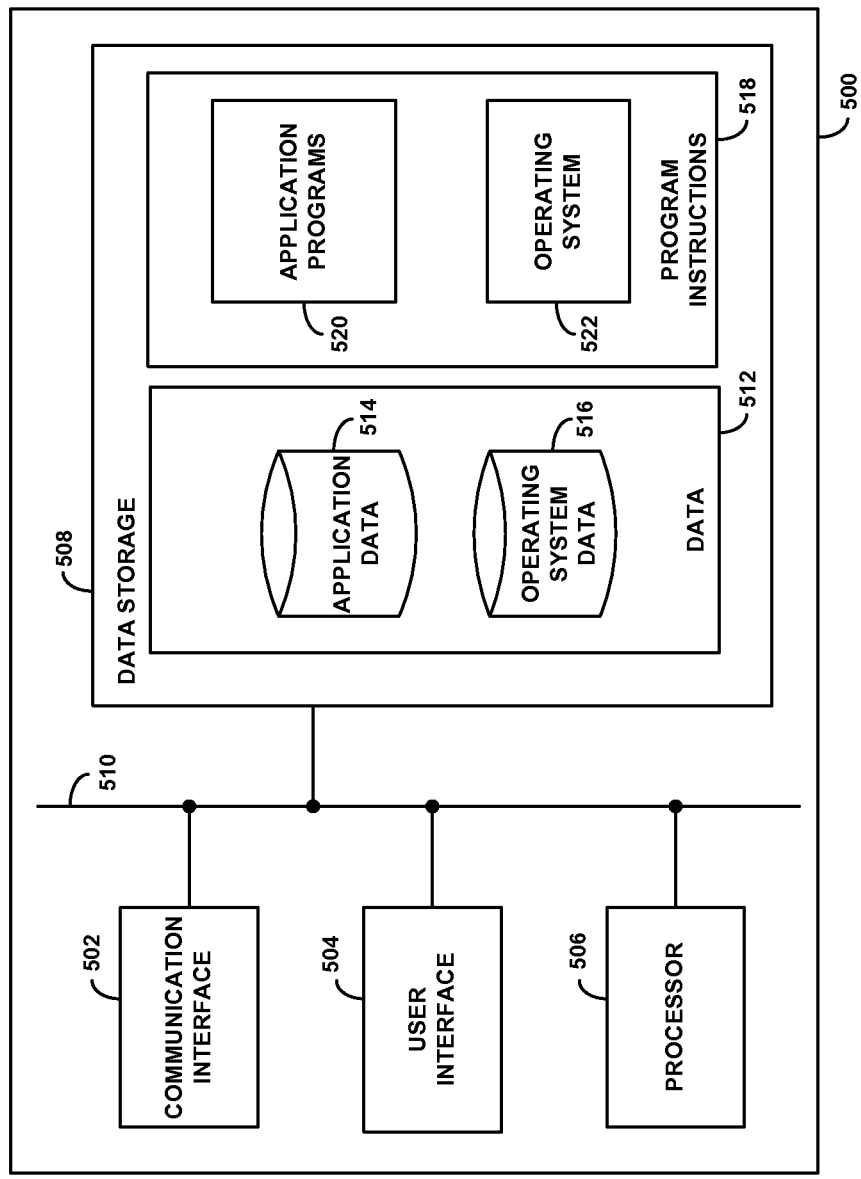
FIG. 5 depicts a block diagram of a client device, in accordance with an example embodiment.

FIG. 5 is a simplified block diagram showing some of the components of an example client device 500. By way of example and without limitation, client device 500 may be or include a "plain old telephone system" (POTS) telephone, a cellular mobile telephone, a still camera, a video camera, a fax machine, an answering machine, a computer (such as a desktop, notebook, or tablet computer), a personal digital assistant, a wearable computing device, a home automation component, a digital video recorder (DVR), a digital TV, a remote control, or some other type of device equipped with one or more wireless or wired communication interfaces.

As shown in FIG. 5, client device 500 may include a communication interface 502, a user interface 504, a processor 506, and data storage 508, all of which may be communicatively linked together by a system bus, network, or other connection mechanism 510.

Communication interface 502 functions to allow client device 500 to communicate, using analog or digital modulation, with other devices, access networks, and/or transport networks. Thus, communication interface 502 may facilitate circuit-switched and/or packet-switched communication, such as POTS communication and/or IP or other packetized communication. For instance, communication interface 502 may include a chipset and antenna arranged for wireless communication with a radio access network or an access point. Also, communication interface 502 may take the form of a wireline interface, such as an Ethernet, Token Ring, or USB port. Communication interface 502 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 502. Furthermore, communication interface 502 may comprise multiple physical communication interfaces (e.g., a Wifi interface, a BLUETOOTH® interface, and a wide-area wireless interface).

User interface 504 may function to allow client device 500 to interact with a human or non-human user, such as to receive input from a user and to provide output to the user. Thus, user interface 504 may include input components such as a keypad, keyboard, touch-sensitive or presence-sensitive panel, computer mouse, trackball, joystick, microphone, still camera and/or video camera. User interface 504 may also include one or more output components such as a display screen (which, for example, may be combined with a touch-sensitive panel), CRT, LCD, LED, a display using DLP technology, printer, light bulb, and/or other similar devices, now known or later developed. User interface 504 may also be configured to generate audible output(s), via a speaker, speaker jack, audio output port, audio output device, earphones, and/or other similar devices, now known or later developed. In some embodiments, user interface 504 may include software, circuitry, or another form of logic that can transmit data to and/or receive data from external user input/output devices. Additionally or alternatively, client device 500 may support remote access from another device, via communication interface 502 or via another physical interface (not shown).

Processor 506 may comprise one or more general purpose processors (e.g., microprocessors) and/or one or more special purpose processors (e.g., DSPs, GPUs, FPUs, network processors, or ASICs). Data storage 508 may include one or more volatile and/or non-volatile storage components, such as magnetic, optical, flash, or organic storage, and may be integrated in whole or in part with processor 506. Data storage 508 may include removable and/or non-removable components.

In general, processor 506 may be capable of executing program instructions 518 (e.g., compiled or non-compiled program logic and/or machine code) stored in data storage 508 to carry out the various functions described herein. Data storage 508 may include a non-transitory computer-readable medium, having stored thereon program instructions that, upon execution by client device 500, cause client device 500 to carry out any of the methods, processes, or functions disclosed in this specification and/or the accompanying drawings. The execution of program instructions 518 by processor 506 may result in processor 506 using data 512.

By way of example, program instructions 518 may include an operating system 522 (e.g., an operating system kernel, device driver(s), and/or other modules) and one or more application programs 520 (e.g., address book, email, web browsing, social networking, and/or gaming applications) installed on client device 500. Similarly, data 512 may include operating system data 516 and application data 514. Operating system data 516 may be accessible primarily to operating system 522, and application data 514 may be accessible primarily to one or more of application programs 520. Application data 514 may be arranged in a file system that is visible to or hidden from a user of client device 500.

Application programs 520 may communicate with operating system 512 through one or more application programming interfaces (APIs). These APIs may facilitate, for instance, application programs 520 reading and/or writing application data 514, transmitting or receiving information via communication interface 502, receiving or displaying information on user interface 504, and so on.

In some vernaculars, application programs 520 may be referred to as "apps" for short. Additionally, application programs 520 may be downloadable to client device 500 through one or more online application stores or application markets. However, application programs can also be installed on client device 500 in other ways, such as via a web browser or through a physical interface (e.g., a USB port) on client device 500.

4. Example System and Operation
a. Example Cross-Lingual Speech-to-Speech System FIG. 6 an example cross-lingual speech-to-speech (S2S) system 600, in accordance with an example embodiment. In addition to functional components, FIG. 6 also shows selected example inputs, outputs, and intermediate products of example operation. The functional components of the S2S system 600 include an ASR subsystem 602 for recognition of speech in an input language, a language translation subsystem 604 for translating the input speech into an output language, and a TTS subsystem 606 for outputting speech in the output language. These functional components could be implemented as machine-language instructions in a centralized and/or distributed fashion on one or more computing platforms or systems, such as those described above. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

Figure 6:
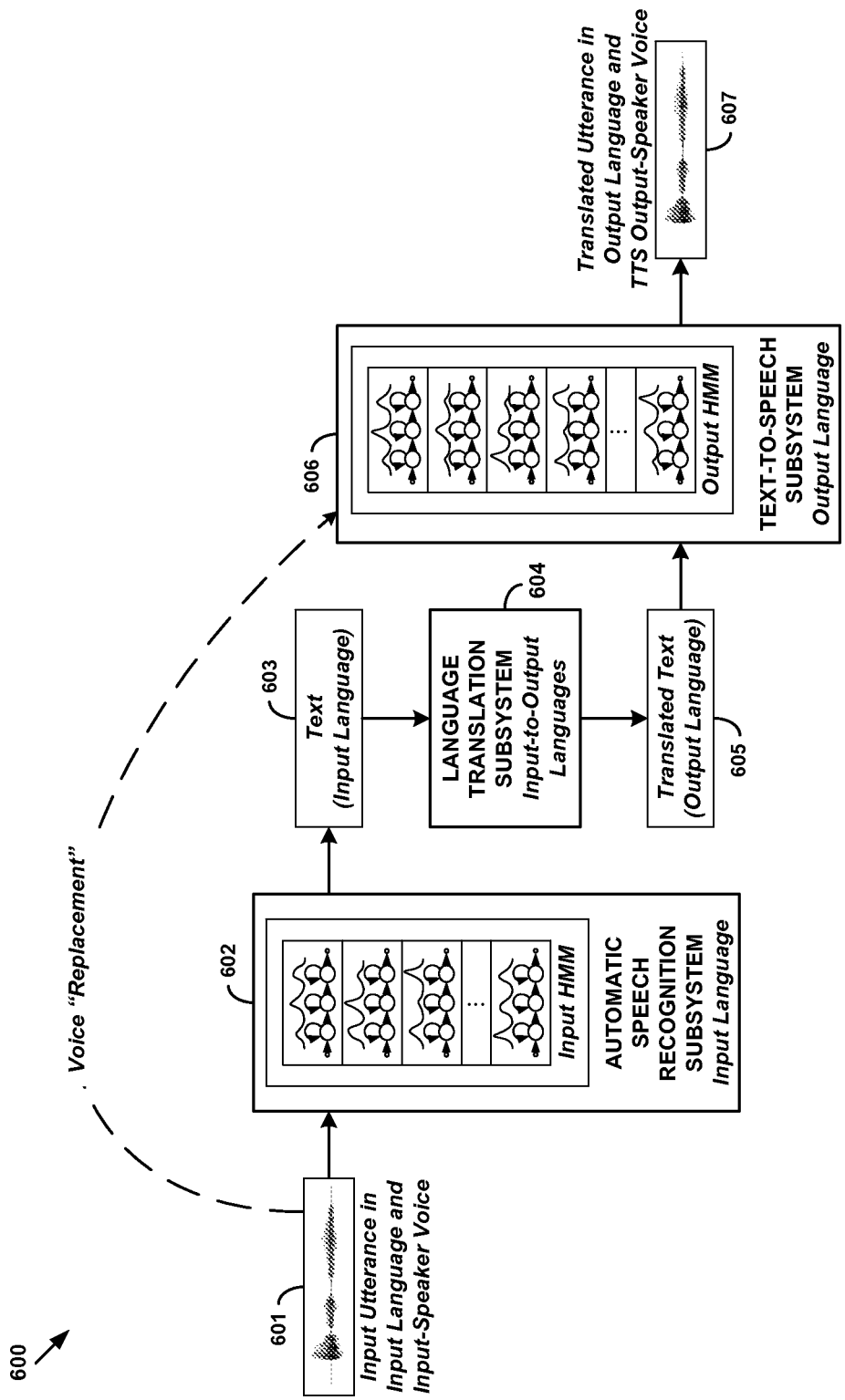
FIG. 6 depicts a block diagram of an example cross-lingual speech-to-speech system, in accordance with an example embodiment.

In accordance with example embodiment, the ASR subsystem 602 may be employ HMM-based speech recognition in the input language. This is illustrated in FIG. 6 by a symbolic depiction of an input HMM in the ASR subsystem 602. The input HMM is represented by a configuration of speech-unit HMMs, each corresponding to a phonetic speech unit of the input language. The phonetic units could be phonemes or triphones, for example. Each speech-unit HMM is drawn as a set of circles, each circle representing a state of the speech unit, and arrows connecting the circles, each arrow representing a state transition. A circular arrow at each state represents a self-transition. Above each circle is a symbolic representation of a PDF. In the HMM methodology, the PDF specifies the probability that a given state will "emit" or generate speech features corresponding to a phase of the speech unit modeled by the state. The depiction in the figure of three states per speech-unit HMM is consistent with some HMM techniques that model three states for each speech unit. However, HMM techniques using different numbers of states per speech units may be employed as well, and the illustrative use of three states in FIG. 6 (as well as in other figures herein) is not intended to be limiting with respect to example embodiments described herein. Further details of an example ASR are described below.

As shown, an input utterance 601 in the input language and spoken by an input speaker may be input to the ASR subsystem 602. The input utterance 601 could be a spoken word, phrase, sentence, or other construct of speech spoken in the input language. It could be spoken in real-time by the input speaker, or input from a recording of the input speaker. In accordance with example embodiments, the ASR subsystem 602 may process the input utterance 602 in order to produce output text 603 in the input language. That is, the output text 603 can be a conversion of the input utterance 601 into a textual form, still in the input language.

The output text 603 may then serve as input to the language translation subsystem 604, which may use one or another technique to translate the text in the input language to corresponding translated text 605 in the output language. The language translation subsystem 604 could use statistical translation, for example.

The translated text 605 may then be input into the TTS subsystem 606, which then processes the input to generate a translated utterance 607 as synthesized speech in the output language. The TTS subsystem 606 is also based on HMM technology, which is represented pictorially by an output HMM in a manner similar to that described above for the input HMM of the ASR subsystem 602.

In accordance with example embodiments, the S2S system 600 receives the input utterance 601 in the input language and converts it into the output utterance 607 translated into the output language. The input utterance 601 is spoken in the voice of the input speaker, and the output utterance 607 is spoken in the voice of an output speaker. In general, the output speaker's voice may depend on how the TTS subsystem 606 is configured (e.g., trained). In practice, the input and output speakers may be different. As a result, the spoken input utterance 601 may be converted into a translated output utterance 607, and the output utterance 607 may be spoken in a different voice that of the input speaker. Thus, while voice of the input speaker may be considered as having been technically "converted" to the voice of the output speaker, the practical result may seem more like "replacement" of the input speaker's voice with the output speaker's voice. This possibility is represented by the dashed arrow labeled "voice 'replacement'" from the input utterance 601 to the TTS subsystem 606. Voice conversion techniques described herein, however, may be used to make the output voice sound like the input voice, even when the input utterance is translated to the output language prior to output speech synthesis.

b. Example Automatic Speech Recognition System

An ASR apparatus may operate by receiving an input audio signal containing a spoken utterance in an input language, processing the audio input signal (e.g., using a digital signal processor) to generate a quantified representation of the signal in the form of "features," and then using the features as observations to model a probable sequence of phonetic speech units of the input language that make up the input utterance. Identifying labels of the phonetic speech unit of the sequence can then be used to derive written text corresponding to the input utterance, thereby rendering the input spoken utterance as a text string.

Features can be considered metrics of an input speech signal that characterize its acoustic contents. Generation of the features is referred to as "feature extraction," and typically involves sampling and quantizing an input speech utterance within sequential temporal frames, and performing spectral analysis of the data in the frames to derive a vector of features associated with each frame. Each feature vector thus provides a snapshot of the temporal evolution of the speech utterance. By way of example, the features may include Mel Filter Cepstral (MFC) coefficients. MFC coefficients may represent the short-term power spectrum of a portion of an input utterance, and may be based on, for example, a linear cosine transform of a log power spectrum on a nonlinear Mel scale of frequency. (A Mel scale may be a scale of pitches subjectively perceived by listeners to be about equally distant from one another, even though the actual frequencies of these pitches are not equally distant from one another.)

In some embodiments, one or more frames of an input utterance may be represented by a feature vector of MFC coefficients, first-order cepstral coefficient derivatives, and second-order cepstral coefficient derivatives. For example, the feature vector may contain 13 coefficients, 13 first-order derivatives ("delta"), and 13 second-order derivatives ("delta-delta"), therefore having a length of 39. However, feature vectors may use different combinations of features in other possible embodiments. As another example, feature vectors could include Perceptual Linear Predictive (PLP) coefficients, Relative Spectral (RASTA) coefficients, Filterbank log-energy coefficients, or some combination thereof. Each feature vector may be thought of as including a quantified characterization of the acoustic content of a corresponding temporal frame of the utterance (or more generally of an audio input signal).

The phonetic content of a spoken utterance can be represented as a sequence of phonetic speech units. As discussed above, the phonetic speech units could be phonemes. A phoneme may be considered to be the smallest segment of speech of given language that encompasses a meaningful contrast with other speech segments of the given language. Thus, a word typically includes one or more phonemes. For purposes of simplicity, phonemes may be thought of as utterances of letters, although this is not a perfect analogy, as some phonemes may present multiple letters. As an example, the phonemic spelling for the American English pronunciation of the word "cat" is /k/ /ae/ /t/, and consists of the phonemes /k/, /ae/, and /t/. Another example is the phonemic spelling for the word "dog" is /d/ /aw/ /g/, consisting of the phonemes /d/, /aw/, and /g/. Different phonemic alphabets exist, and other phonemic representations are possible. Common phonemic alphabets for American English contain about 40 distinct phonemes. Other languages may be described by different phonemic alphabets containing different phonemes.

The phonetic properties of a phoneme in an utterance can depend on, or be influenced by, the context in which it spoken. For example, a "triphone" is a triplet of phonemes in which the spoken rendering of a given phoneme is shaped by a temporally-preceding phoneme, referred to as the "left context," and a temporally-subsequent phoneme, referred to as the "right context." Thus, the ordering of the phonemes of English-language triphones corresponds to the direction in which English is read. Other phoneme contexts, such as quinphones, may be considered as well.

In accordance with example embodiments, HMM-based modeling can be used to recognize an observed sequence of feature vectors as corresponding in a probabilistic sense to a sequence of speech units (e.g., phonemes, triphones, words, etc.). In this approach, each phonetic speech unit may be represented by a respective HMM that models temporal evolution as transitions between HMM states, and that models acoustic properties as probabilities of "emitting" or generating particular features while in a temporal phase of the speech unit modeled by the state. By computing a sequence of HMMs and HMM states that maximize a joint probability of generating the observed sequence of feature vectors, the sequence of phonetic speech units corresponding the computed sequence of HMMs and HMM states may be used to determine a phonetic transcription of the input speech utterance, from which the speech content recognized and converted to text.

In some HMM-based techniques, phonemes and/or triphones are represented by HMMs as having three states corresponding to three temporal phases, namely beginning, middle, and end. Other HMMs with a different number of states per phoneme could be used as well.

In further accordance with example embodiments, emission probabilities associated with HMM states may be modeled by multivariate probability distribution functions (PDFs) for jointly modeling the different features that make up the feature vectors. In particular, multivariate Gaussian PDFs can be used to compute probabilities of observing multiple dimensions of features from a given state of the model. Each dimension of a given multivariate Gaussian PDF could thus correspond to different feature. It is also possible to model a feature along a given dimension with more than one Gaussian PDF in that dimension. In such an approach, the feature is said to be modeled by a mixture of Gaussians, referred to a "Gaussian mixture model" or "GMM."

Also in accordance with example embodiments, values of parameters of the multivariate PDFs could be determined by way of a training procedure. More particularly, the parameters could be "tuned" for a given language by inputting sample speech utterances for which corresponding text in the given language is known, and adjusting the parameters to achieve the known results. The sample speech utterances and corresponding text may be part of "corpus" or body of speech samples contained in a speech database.

Figure 7:
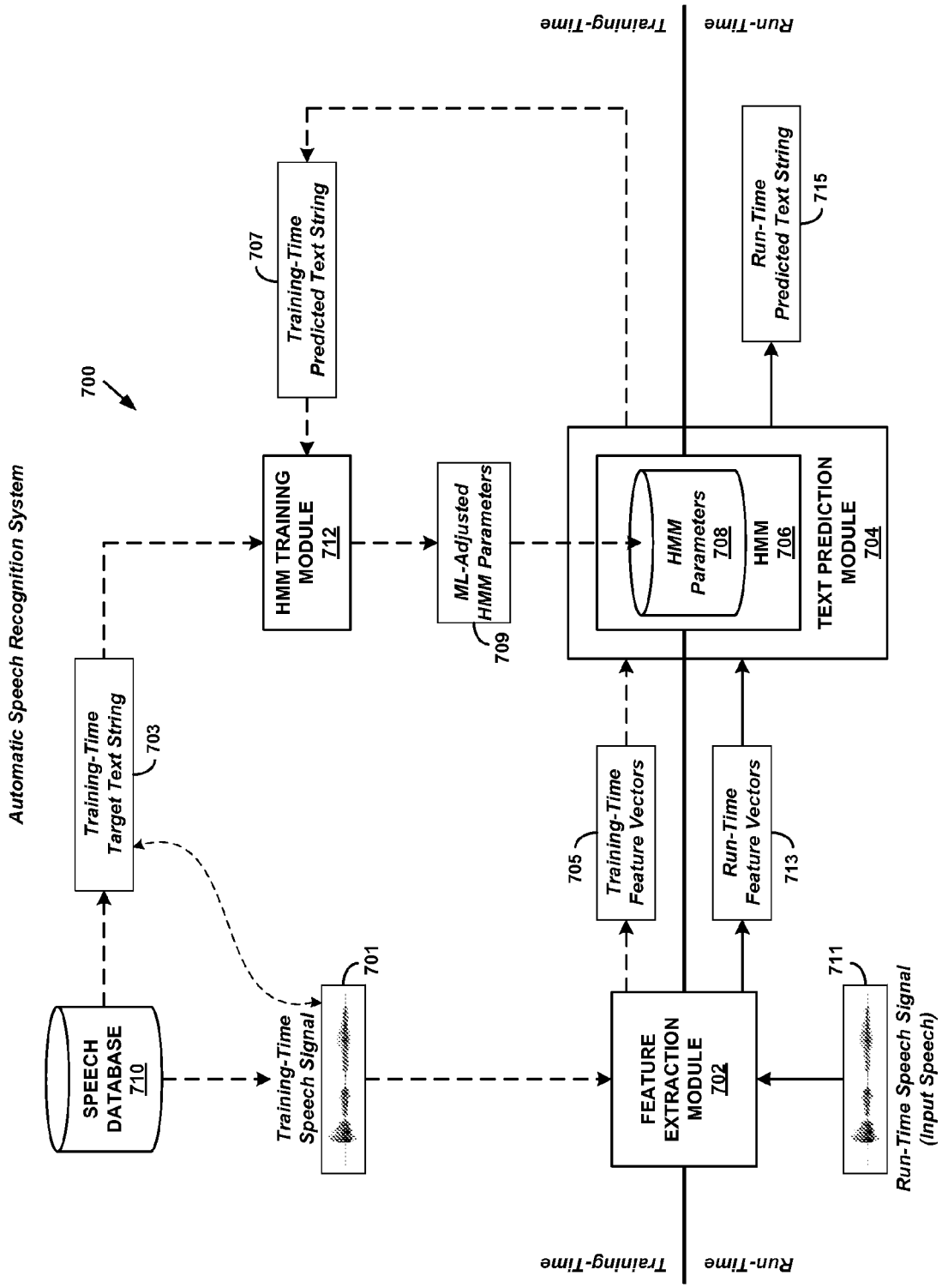
FIG. 7 depicts a block diagram of an example automatic speech recognition system, in accordance with an example embodiment.

FIG. 7 depicts a block diagram of an example automatic speech recognition (ASR) system 700, in accordance with an example embodiment. In addition to functional components, FIG. 7 also shows selected example inputs, outputs, and intermediate products of example operation. The functional components of the speech synthesis system 700 include a feature extraction module 702, a text prediction module 704 that includes a HMM module 706, which in turn includes HMM parameters 708, a speech database 710, and a HMM training module 712. These functional components could be implemented as machine-language instructions in a centralized and/or distributed fashion on one or more computing platforms or systems, such as those described above. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

It should be noted that the discussion in this section, and the accompanying figures, are presented for purposes of example. Other ASR system arrangements, including different components, different relationships between the components, and/or different processing, may be possible.

The figure is depicted in a way that represents two operational modes: training-time and run-time. A thick, horizontal line marks a conceptual boundary between these two modes, with "Training-Time" labeling a portion of FIG. 7 above the line, and "Run-Time" labeling a portion below the line. For purposes of organizing the present discussion, various arrows in the figure signifying information and/or processing flow and/or transmission are shown as dashed lines in the "Training-Time" portion of the figure, and as solid lines in the "Run-Time" portion.

During training, a training-time speech signal 701 from the speech database 708 may be input to the feature extraction module 702, which then generates training-time feature vectors 705. The training-time feature vectors 705 are then input to the text prediction module 704, which generates a training-time predicted text string 707 according to the technique described generally above. Specifically, the HMM module is used to compute a most likely sequence of phonemes or triphones (or other phonetic speech units) corresponding to the observed training-time feature vectors 705. The sequence of phonetic units may then be used to construct a corresponding the training-time predicted text string 707. Although not necessarily explicitly shown in FIG. 7, the corpus of speech data may also include phonetic speech units and associated labels accessed by the text prediction module 704 in the process of predicting training-time text strings (including the training-time predicted text string 707). The training-time predicted text string 707 is then input to the HMM training module 712.

During training time, a training-time target text string 703 from the speech database 710 is also provided as input to the HMM training module 712. The training-time target text string 703 is predetermined to correspond to the training-time speech signal 701; this is signified by a wavy, dashed double arrow between the training-time target text string 703 and the training-time speech signal 701. In practice, the training-time speech signal 701 could be a speech recording of a speaker reading the training-time target text string 703. More specifically, the corpus of training data in the speech database 710 could include numerous recordings of one or more speakers reading numerous text strings.

By comparing the training-time predicted text string 707 with the training-time target text string 703, the HMM training module 712 can determine how to adjust the HMM parameters 708 so as to achieve closest or optimal agreement between the predicted result and the known result. While this conceptual illustration of HMM training may appear suggestive of a feedback loop for error reduction, the procedure could entail a maximum likelihood (ML) adjustment of the HMM parameters. This is indicated by the return of ML-adjusted HMM parameters 709 from the HMM training module 712 to the HMM parameters 708. In practice, the training procedure may involve many iterations over many different speech samples and corresponding text strings in order to cover all (or most) of the phonetic speech units of the language of the ASR subsystem 700 with sufficient data to determine accurate parameter values.

During run-time operation, illustrated in the lower portion of FIG. 7 (below thick horizontal line), a run-time speech signal 711 is input to the feature extraction module 702, which then generates run-time feature vectors 713. The run-time feature vectors 713 are then input to the text prediction module 704, which generates a run-time predicted text string 715, again according to the HMM-based technique. With sufficient prior training, the run-time predicted text string 715 may have a high likelihood of being an accurate textual transcription of the run-time speech signal 711.

c. Example Text-to-Speech System

A TTS apparatus may operate by receiving an input text string, processing the text string into a symbolic representation of the phonetic and linguistic content of the text string, generating a sequence of speech features corresponding to the symbolic representation, and providing the speech features as input to a speech synthesizer in order to produce a spoken rendering of the input text string. The symbolic representation of the phonetic and linguistic content of the text string may take the form of a sequence of labels, each label identifying a phonetic speech unit, such as a phoneme, and further identifying or encoding linguistic and/or syntactic context, temporal parameters, and other information for specifying how to render the symbolically-represented sounds as meaningful speech in a given language. While the term "phonetic transcription" is sometimes used to refer to such a symbolic representation of text, the term "enriched transcription" introduced above will instead be used herein, in order to signify inclusion of extra-phonetic content, such as linguistic and/or syntactic context and temporal parameters, represented in the sequence of labels. In some ways, TTS operation can be viewed conceptually as a reverse of ASR operation, though the analogy is not precise.

As with ASR, speech features may be taken as a signature of acoustic properties of speech, although different specific type of features may be used for driving generation of a synthesized waveform corresponding to an output speech signal. Generally, features for speech synthesis account for three major components of speech signals, namely spectral envelopes that resemble the effect of the vocal tract, excitation that simulates the glottal source, and prosody that describes pitch contour ("melody") and tempo (rhythm).

In accordance with example embodiments of HMM-based speech synthesis, the sequence of labels corresponding to enriched transcription of the input text may be treated as observed data, and a sequence of HMMs and HMM states is computed so as to maximize a joint probability of generating the observed enriched transcription. The labels of the enriched transcription sequence may identify phonemes, triphones, and/or other phonetic speech units. In addition, the enriched transcription may also include additional information about the input text string, such as time or duration models for the phonetic speech units, linguistic and/or syntactic context, and other indicators that may characterize how the output text string should sound when rendered as speech, for example.

In accordance with example embodiments, speech features corresponding to HMMs and HMM states may be represented by multivariate PDFs for jointly modeling the different features that make up the feature vectors. In particular, multivariate Gaussian PDFs can be used to compute probabilities of a given state emitting or generating multiple dimensions of features from a given state of the model. Each dimension of a given multivariate Gaussian PDF could thus correspond to different feature. The sequence of features generated by the most probable sequence of HMMs and HMM states can be converted to speech by a speech synthesizer, for example. As with an ASR system, Gaussian mixture models may be used for one more dimensions of the multivariate PDFs of a TTS system.

In further accordance with example embodiments, the HMMs of a HMM-based TTS or speech synthesis subsystem may be trained by tuning the PDF parameters using a database of text recorded speech and corresponding known text strings. The training techniques may be similar to those used for an HMM-based ASR subsystem, although the specific speech parameters may differ, at least in part, from those used in ASR.

Figure 8:
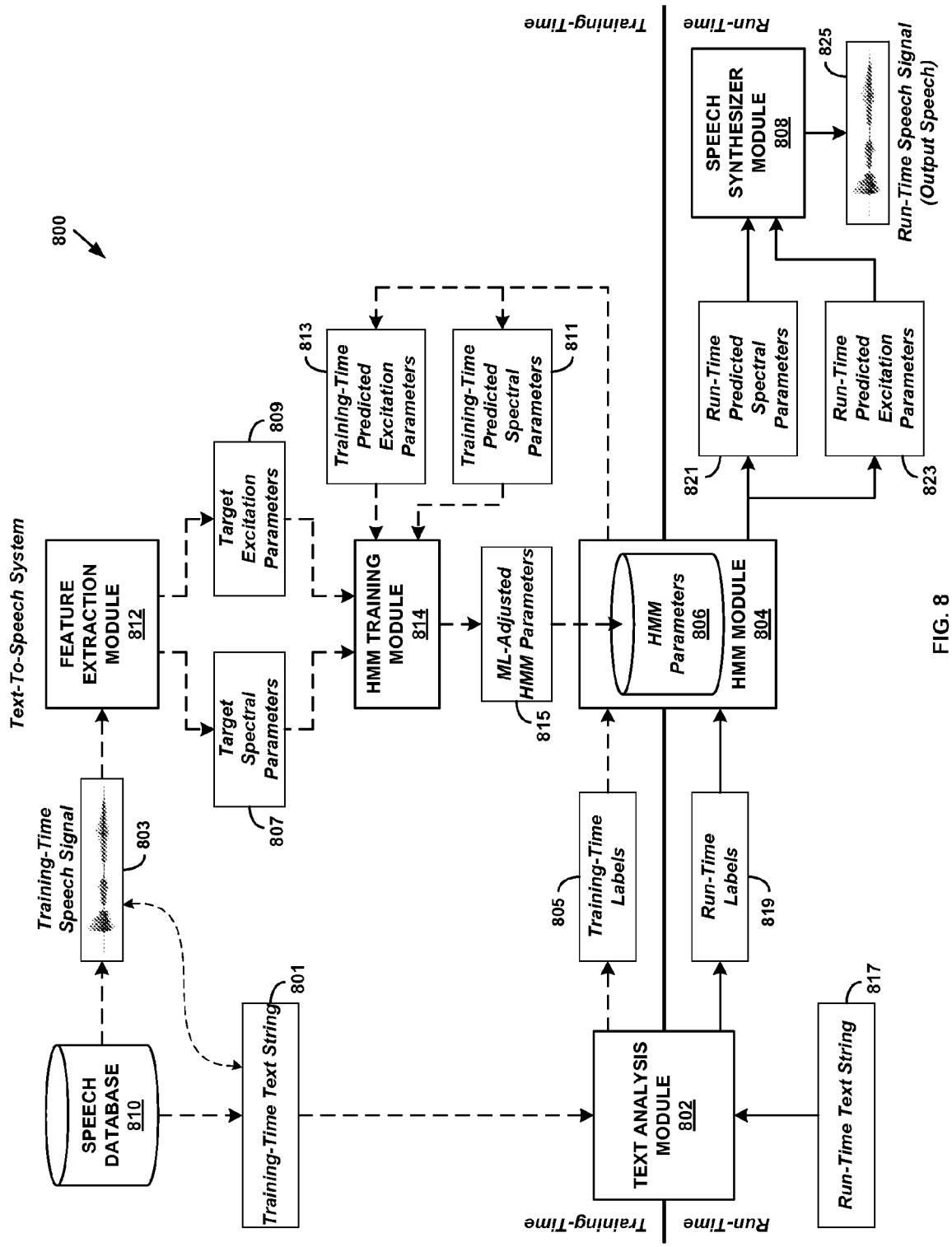
FIG. 8 depicts a block diagram of an example text-to-speech speech system, in accordance with an example embodiment.

FIG. 8 depicts a block diagram of an example text-to-speech speech system 800, in accordance with an example embodiment. In addition to functional components, FIG. 8 also shows selected example inputs, outputs, and intermediate products of example operation. The functional components of the speech synthesis system 800 include a text analysis module 802, a HMM module 804 that includes HMM parameters 806, a speech synthesizer module 808, a speech database 810, a feature extraction module 812, and a HMM training module 814. These functional components could be implemented as machine-language instructions in a centralized and/or distributed fashion on one or more computing platforms or systems, such as those described above. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

It should be noted that the discussion in this section, and the accompanying figures, are presented for purposes of example. Other TTS system arrangements, including different components, different relationships between the components, and/or different processing, may be possible.

As with FIG. 7, FIG. 8 is depicted in a way that represents two operational modes: training-time and run-time. A thick, horizontal line marks a conceptual boundary between these two modes, with "Training-Time" labeling a portion of FIG. 8 above the line, and "Run-Time" labeling a portion below the line. For purposes of organizing the present discussion, various arrows in the figure signifying information and/or processing flow and/or transmission are shown as dashed lines in the "Training-Time" portion of the figure, and as solid lines in the "Run-Time" portion.

During training, a training-time text string 801 from the speech database 810 may be input to the text analysis module 802, which then generates training-time labels 805 (an enriched transcription of training-time text string 801). Each training-time label could be made up of a phonetic label identifying a phonetic speech unit (e.g., a phoneme), context information (e.g., one or more left-context and right-context phoneme labels, physical speech production characteristics, linguistic context, etc.), and timing information, such as a duration, relative timing position, and/or phonetic state model.

The training-time labels 805 are then input to the HMM module 804, which models training-time predicted spectral parameters 811 and training-time predicted excitation parameters 813. These may be considered speech features that are generated by the HMM module according to state transition probabilities and state emission probabilities that make up (at least in part) the HMM parameters. The training-time predicted spectral parameters 811 and training-time predicted excitation parameters 813 are then input to the HMM training module 814, as shown.

In further accordance with example embodiments, during training a training-time speech signal 803 from the speech database 810 is input to the feature extraction module 812, which processes the input signal to generate target spectral parameters 807 and target excitation parameters 809. The training-time speech signal 803 is predetermined to correspond to the training-time text string 801; this is signified by a wavy, dashed double arrow between the training-time speech signal 803 and the training-time text string 801. In practice, the training-time speech signal 801 could be a speech recording of a speaker reading the training-time text string 803. More specifically, the corpus of training data in the speech database 810 could include numerous recordings of one or more speakers reading numerous text strings. The target spectral parameters 807 and target excitation parameters 809 may be considered known parameters, since they are derived from a known speech signal.

During training time, the target spectral parameters 807 and target excitation parameters 809 are provided as input to the HMM training module 814. By comparing the training-time predicted spectral parameters 811 and training-time predicted excitation parameters 813 with the target spectral parameters 807 and target excitation parameters 809, the HMM training module 814 can determine how to adjust the HMM parameters 806 so as to achieve closest or optimal agreement between the predicted results and the known results. While this conceptual illustration of HMM training may appear suggestive of a feedback loop for error reduction, the procedure could entail a maximum likelihood (ML) adjustment of the HMM parameters. This is indicated by the return of ML-adjusted HMM parameters 815 from the HMM training module 814 to the HMM parameters 806. In practice, the training procedure may involve many iterations over many different speech samples and corresponding text strings in order to cover all (or most) of the phonetic speech units of the language of the TTS subsystem 800 with sufficient data to determine accurate parameter values.

During run-time operation, illustrated in the lower portion of FIG. 8 (below thick horizontal line), a run-time text string 817 is input to the text analysis module 802, which then generates run-time labels 819 (an enriched transcription of run-time text string 817). The form of the run-time labels 819 may be the same as that for the training-time labels 805. The run-time labels 819 are then input to the HMM module 804, which generates run-time predicted spectral parameters 821 and run-time predicted excitation parameters 823, again according to the HMM-based technique.

The run-time predicted spectral parameters 821 and run-time predicted excitation parameters 823 can generated in pairs, each pair corresponding to a predicted pair of feature vectors for generating a temporal frame of waveform data.

In accordance with example embodiments, the run-time predicted spectral parameters 821 and run-time predicted excitation parameters 823 may next be input to the speech synthesizer module 808, which may then synthesize a run-time speech signal 825. As an example, speech synthesize could include a vocoder that can translate the acoustic features of the input into an output waveform suitable for playout on an audio output device, and/or for analysis by a signal measuring device or element. Such a device or element could be based on signal measuring hardware and/or machine language instructions that implement an analysis algorithm. With sufficient prior training, the run-time speech signal 825 may have a high likelihood of being an accurate speech rendering of the run-time text string 817.

d. HMM-Based Voice Conversion

Returning for the moment to the cross-lingual S2S system 600 of FIG. 6, the input HMM in the ASR subsystem 602 may be considered to be a configuration of HMM state models for modeling the input language. Multivariate Gaussian PDFs for modeling features of each input state may be determined by way of training. As such, they are constructed according to phonetics of the input language. Similarly, the output HMM in the TTS subsystem 606 may be considered to be a configuration of HMM state models for modeling in the output language. Multivariate Gaussian PDFs for modeling features of each output state may also be determined by way of training. As such, they are constructed according to phonetics of the output language.

With the arrangement shown in FIG. 6, the S2S system 600 may convert an input utterance 601 at run-time into a translated output utterance 607 spoken in a voice modeled by the output HMM. In general, the output voice may be different than that of a run-time speaker, or even different than that of in input HMM training voice (or voices). In accordance with example embodiments, the HMM used by the TTS subsystem (or, more generally, by an output speech modeling subsystem of a S2S system) may be configured so as to sound like the voice a run-time input speaker.

A technique for achieving high quality voice conversion of this type is illustrated conceptually in FIGS. 9(A-C). In accordance with example embodiments, the HMM of an output speech modeling subsystem of a S2S system (e.g., a TTS subsystem) may be configured using parameters and characteristics of an input HMM, and further adapted with characteristics of a run-time input speaker, while still retaining structure for modeling speech of the output language.

Figure 9A:
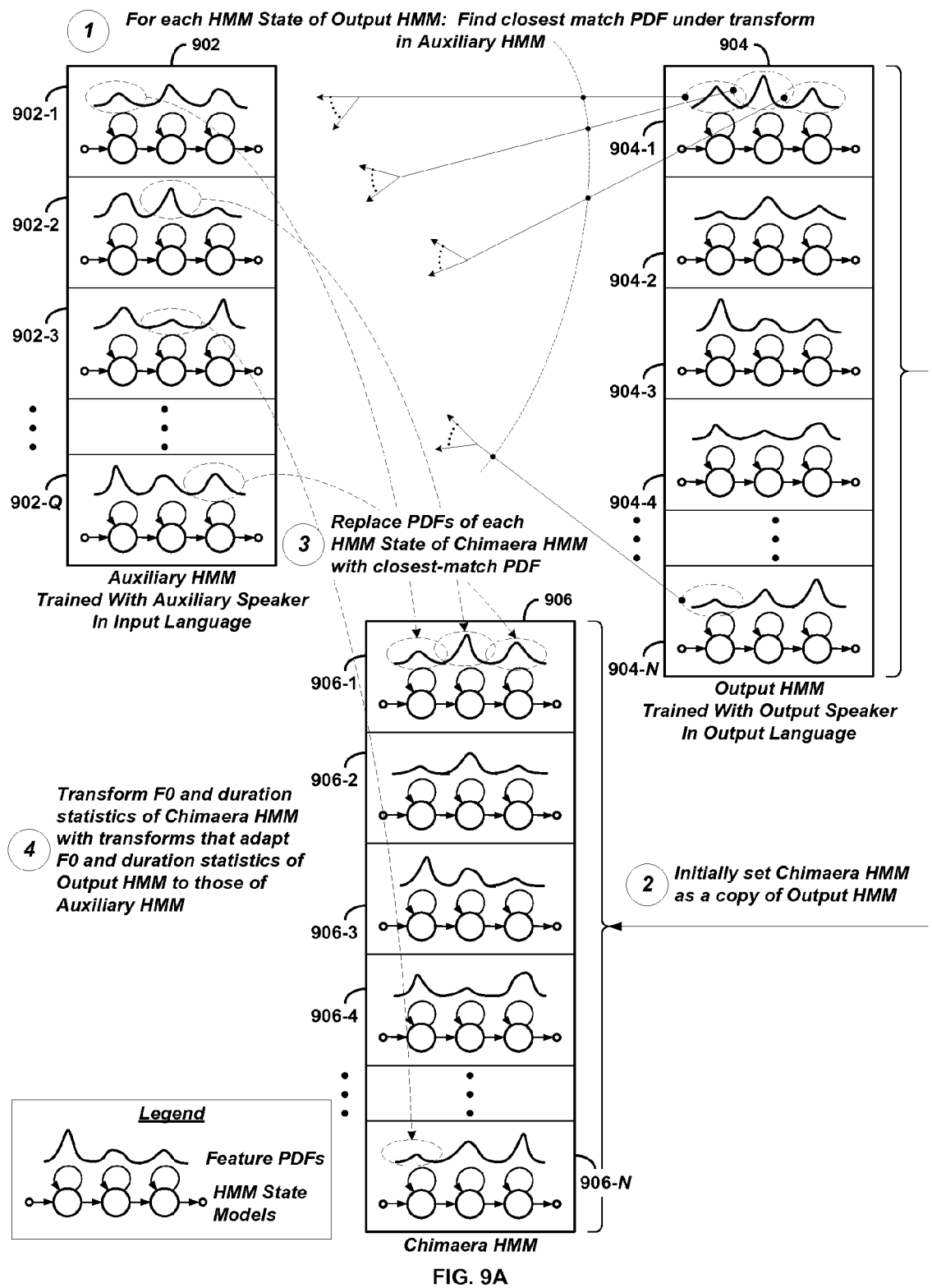
FIG. 9A is a schematic illustration of a first aspect of configuring of a voice conversion system, in accordance with an example embodiment.

FIG. 9A is a schematic illustration of a first aspect of configuring of a voice conversion system, in accordance with example embodiments. As shown, an auxiliary HMM 902 may be trained in an input language using recordings (or other speech waveforms) of an auxiliary speaker. The auxiliary HMM 902 can include a configuration of Q HMM state models 902-1, 902-2, 902-3, . . . , 902-Q, as shown. The auxiliary HMM 902 could be used, for example, as the input HMM of a S2S system, such as the illustrated in FIG. 6.

Similarly, an output HMM 904 can be trained in an output language using recordings (or other speech waveforms) of an output speaker. The output HMM 904 can include a configuration of N HMM state models 904-1, 904-2, 904-3, 904-4, . . . , 904-N, as shown. The output HMM 904 could be used, for example, as the output HMM of a S2S system, such as the illustrated in FIG. 6.

As indicated in the legend at the bottom left of FIG. 9A, each HMM state model in FIG. 9A is represented pictorially as a sequence of three states (shown as circles) connected by arrows representing state transitions; each state has a self-transition represented by a circular arrow. A symbolic PDF is shown above each state. The particular forms of the PDFs, as well as the representation of three states per HMM state model is intended to be illustrative, and not necessarily limiting with respect to embodiments herein.

In accordance with example embodiments, the PDFs of the HMM state models of the auxiliary HMM 902 and the output HMM 904 may include multivariate Gaussian PDFs for jointly modeling spectral envelope parameters, and multivariate Gaussian PDFs for jointly modeling excitation parameters. Although this detail of the PDFs is not necessarily shown explicitly in the pictorial representation of the HMM states in FIG. 9A, it may be assumed in references to PDFs in the discussions below. It should also be noted, however, that other forms of PDFs may be used in statistical modeling of speech, including in other HMM-based techniques.

Since the input language may be different from the output language, the number of HMM state models in the auxiliary HMM 902 may be different from the number of HMM state models in the output HMM 904. That is Q may not, in general, necessarily be equal to N. Further, the specific forms of the HMM state models of the auxiliary HMM 902 may differ from the specific forms of the HMM state models of the output HMM 904. For example, the input and output languages may have different phonemes, triphones, and/or other phonetic speech units. The number of states used to model phonetic speech units could also differ between the input and output languages.

In accordance with example embodiments, a matching procedure is carried out to determine a best match to each state model of the output HMM 904 from among the state models of the auxiliary HMM 902. The matching procedure is indicated in descriptive text, enumerated as step 1, in FIG. 9A, and illustrated conceptually in FIG. 9A by a respective forked arrow pointing from each of a respective example HMM state of the output HMM 904 to the HMM states of the auxiliary HMM 902. By way of illustration, each of three PDFs of the HMM state model 904-1 and one of the PDFs of the HMM state model 904-N has a forked arrow pointing to the HMM state models of the auxiliary HMM 902. Each of the four forked arrows shown symbolizes a form of search for a most closely matching PDF from among the HMM state models of the auxiliary HMM 902. A similar search may be performed for all of the other HMM state models of the output HMM 904. However, only four are depicted for the sake of brevity in the figure. As described in more detail below, the matching procedure is involves a matching under transform technique that compensates for differences between the auxiliary speaker and the output speaker.

In further accordance with example embodiments, a cross-lingual HMM, referred to herein as a "chimaera" HMM 906, is constructed. As indicated by the descriptive text enumerated as step 2 in FIG. 9A, the chimaera HMM is initially just a copy of the output HMM. The chimaera HMM 906 thus includes a configuration of N HMM state models 906-1, 906-2, 906-3, 906-4, . . . , 906-N, as shown. These are initially identical to the N HMM state models of the output HMM 904.

Following initial construction of the chimaera HMM 906, each of its state models is replaced by a particular state model from the auxiliary HMM 902 determined to be the closest match to the corresponding state model of the output HMM 904. The replacement operation is indicated in descriptive text, enumerated as step 3, in FIG. 9A, and displayed pictorially by curved, dashed arrows from representative HMM states of the auxiliary HMM 902 to representative HMM states of the chimaera HMM 906. As a conceptual illustration, a PDF of each of the HMM state models 902-1, 902-2, 902-3, and 902-Q is shown as being a replacement for PDFs of HMM state models 906-1 and 906-N of the chimaera HMM 906. A similar replacement may be performed for all of the other HMM state models of the chimaera HMM 906. However, only four are explicitly shown for the sake of brevity in the figure.

After each of the HMM states of the initially constructed chimaera HMM 906 have been replaced by the best matches from the auxiliary HMM 902, the chimaera HMM 906 is next speech adapted to other characteristics of the auxiliary speaker not necessarily represented in the PDFs of the HMM state models of the auxiliary HMM 902. More specifically, an F0 transform may be computed that adapts statistics of F0 of the output HMM 904 to the F0 statistics of the auxiliary HMM 902. The adaptation can be made to match up to first order statistics (means), second order statistics (means and variances), or higher (e.g., matching PDFs). The adaptation can be made directly on values of F0, or on the means of Gaussian states of the HMMs.

In a similar vein, a duration transform may be computed that adapts statistics of durations of the output HMM 904 to the duration statistics of the auxiliary HMM 902. The adaptation can be made to match up to first order statistics (means), second order statistics (means and variances), or higher (e.g., matching PDFs). The adaptation can be made directly on values of duration, or on the means of Gaussian states of the HMMs, or on the parameters of other statistical models that may be used to model durations.

The computed F0 transform can be applied to the chimaera HMM 906 to adapt the F0 statistics of the chimaera HMM 906 to the F0 statistics of the auxiliary HMM 902. For example, the means of the Gaussian states of the chimaera HMM 906 may be transformed in this way. Similarly, computed duration transform can be applied to the chimaera HMM 906 to adapt the duration statistics of the chimaera HMM 906 to the duration statistics of the auxiliary HMM 902. For example, the durations of the chimaera HMM 906 may be transformed in this way. This adaptation operation is indicated by as step 4 in descriptive text in FIG. 9A.

In accordance with example embodiments, the operations illustrated by way of example in FIG. 9A could be carried out offline or otherwise prior to run-time application of a S2S voice conversion system, and for multiple pairs of input and output languages. In this way, a S2S voice conversion system could be prepared for use by multiple run-time users (or speakers), and for multiple configurations of language translation with voice conversion. For example, robust, well-trained ASR systems and TTS system that have already been developed, configured, and/or deployed their respective tasks could be serve as ASR and TTS subsystems of cross-lingual voice conversion system. As such, the respective HMMs of these subsystems could provide the initial auxiliary and output HMMs, for example.

Figure 9B:
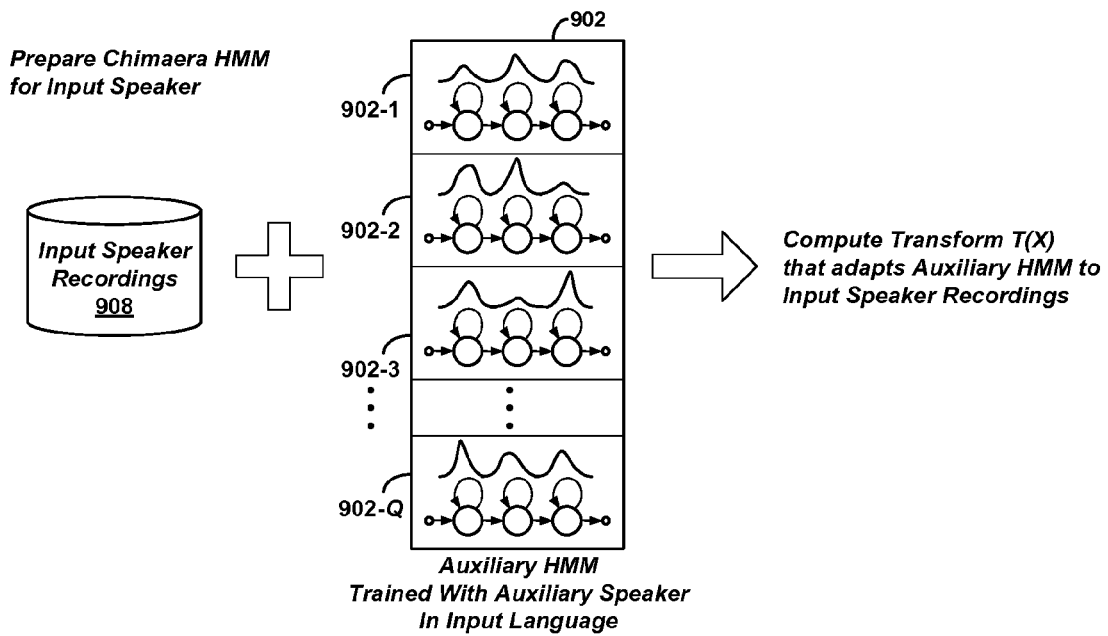
FIG. 9B is a schematic illustration of a second aspect of configuring of a voice conversion system, in accordance with an example embodiment.

FIG. 9B is a schematic illustration of a second aspect of configuring of a voice conversion system, in accordance with an example embodiment. Specifically, the chimaera HMM 906 constructed as described above may be prepared for voice conversion of a particular input speaker by computing an applying speech adaptation transforms. In accordance with example embodiments, speech adaptation transforms, labeled "T(X)" in FIG. 9B, that adapt the auxiliary HMM 902 to input speaker speech recordings 908 maybe be computed. For example, adaptation techniques used in automatic speech recognition, such as maximum likelihood linear regression (MLLR) and constrained MLLR (CMLLR) may be used to compute one or more appropriate speech adaptation transforms.

The input speaker speech recordings 908 could be created by the input speaker at any time prior to run-time, for example. The computed speech adaptation transforms T(X) could then be stored for future use in one or more invocations of voice conversion specific to the input speaker, and applicable to any one or more chimaera HMMs corresponding to any one or more input-output language pairs.

Figure 9C:
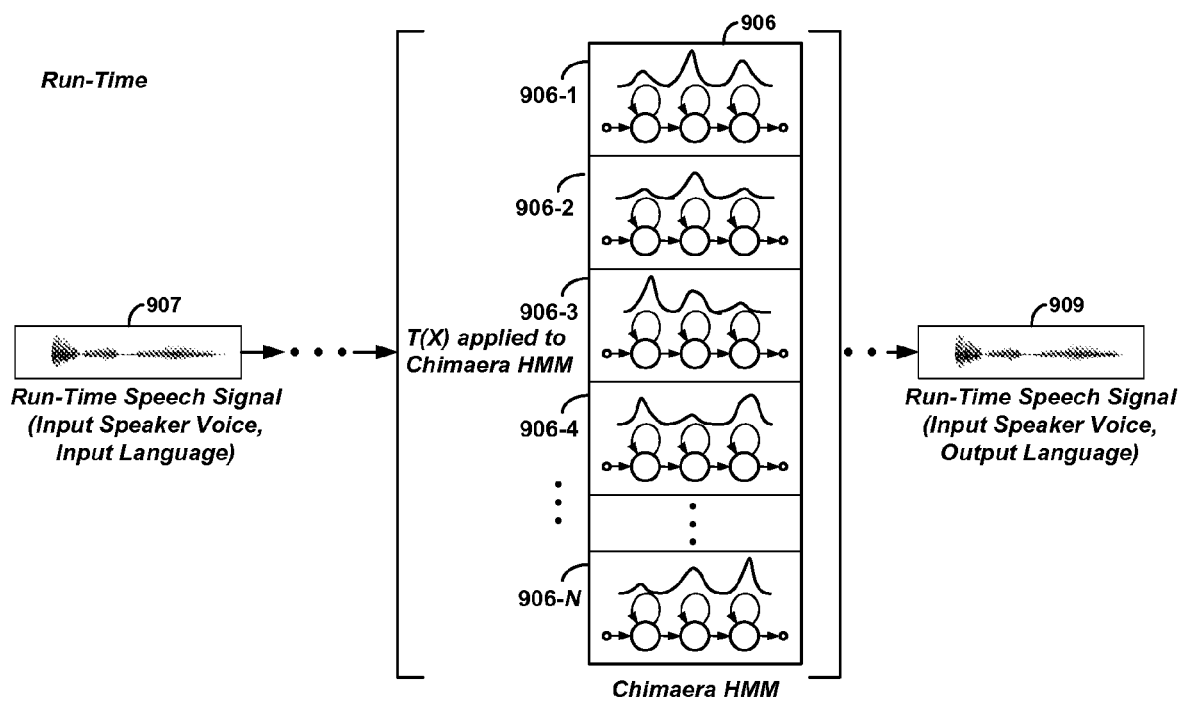
FIG. 9C is a schematic illustration of a third aspect using a voice conversion system, in accordance with an example embodiment.

FIG. 9C is a schematic illustration of a third aspect using a voice conversion system, in accordance with an example embodiment. More particularly, FIG. 9C illustrates run-time operation of voice conversion using the chimaera HMM 906. In accordance with example embodiments, the speech adaptation transforms T(X) may be applied to the chimaera HMM 906 in order to adapt the HMM states of the chimaera HMM 906 to the voice of the input speaker. The speech-adapted chimaera HMM 906 is shown in square brackets in FIG. 9C to signify that the chimaera HMM 906 has been configured for run-time conversion of the input speaker's voice.

A run-time speech signal 907 of the input speaker in the input language may processed by the S2S system, ultimately arriving at the speech adapted chimaera HMM 906 as text in the output language. The speech adapted chimaera HMM 906 can then generate speech features for speech synthesis of the translate text, and the translated text can then be output as a run-time speech signal 909 in the output language and with the voice of the input speaker.

Figure 10:
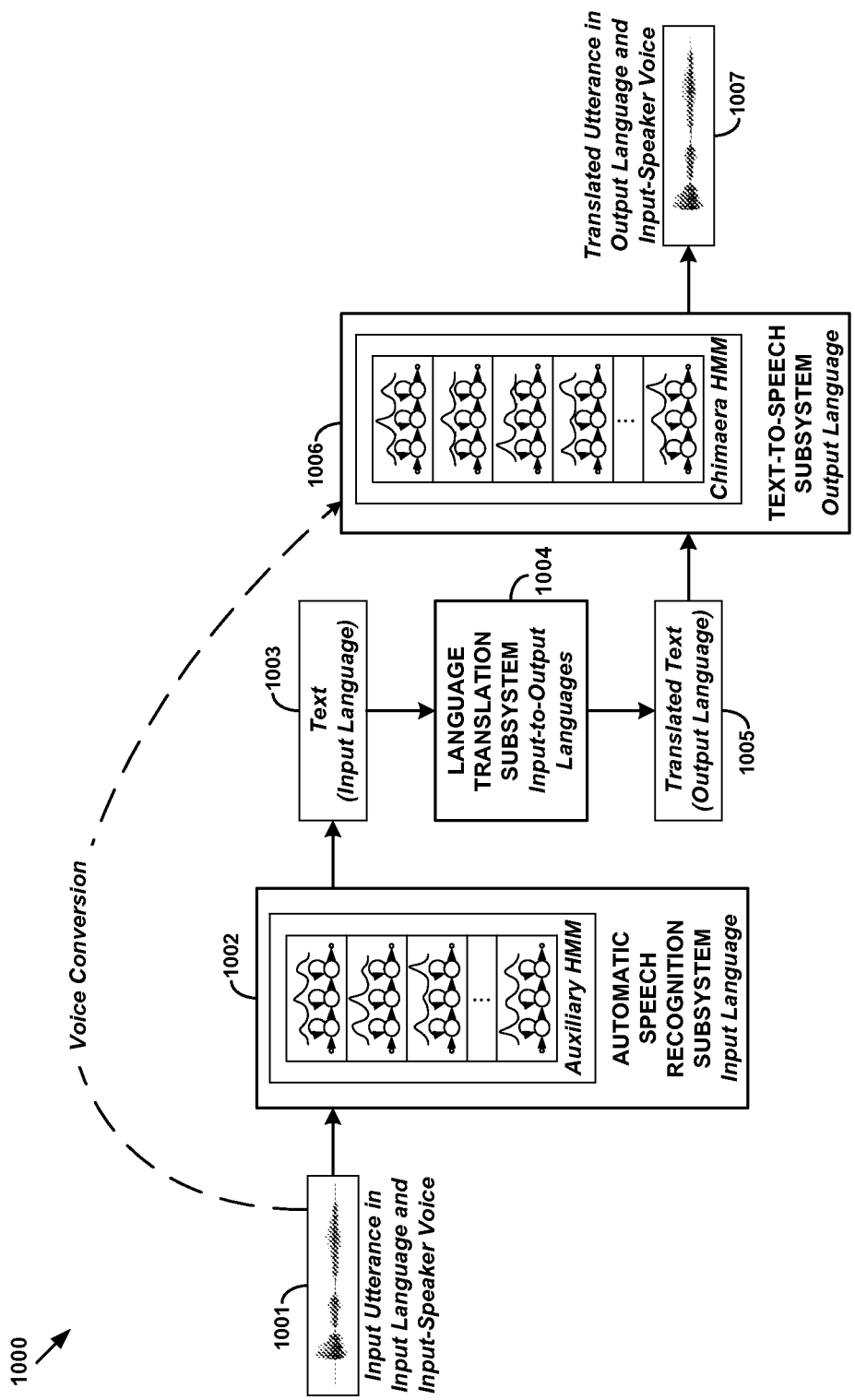
FIG. 10 depicts a block diagram of an example cross-lingual voice conversion system, in accordance with an example embodiment.

FIG. 10 depicts a block diagram of an example cross-lingual S2S system 1000 that implements voice conversion, in accordance with an example embodiment. The S2S system 1000 is similar to the S2S system shown in FIG. 6, except that a chimaera HMM configured as described above is used for generating speech features for speech synthesis. The functional components of the S2S system 1000 include an ASR subsystem 1002 for recognition of speech in an input language, a language translation subsystem 1004 for translating the input speech into an output language, and a TTS subsystem 1006 for outputting speech in the output language. In selected example inputs, outputs, and intermediate products of example operation are also depicted.

Operation of the S2S system 1000 is largely the same that described for the S2S system 600, except that the S2S system 1000 performs voice conversion that causes the output voice of the TTS subsystem 1006 to sound like the voice of the input speaker. More specifically, an input utterance 1001 in an input language and in the voice of an input speaker may recognized by the ASR subsystem 1002, converted to text 1003 in the input language, translated by the language translation system 1004 into translated text 1005 in the output language, the converted by the TTS subsystem 1006 to a translated utterance 1007 in the output language and in the voice of the input speaker. The TTS subsystem 1006 implements a chimaera HMM that may be prepared as described above to generate speech features in the output language but with the voice of the input speaker. As shown, the ASR subsystem 1002 implements the auxiliary HMM for recognition. It should be noted that this is not necessarily required for voice conversion. However, the auxiliary HMM is shown as a visual cue to role it plays in preparation of the chimaera HMM. A different input HMM could be used in the ASR subsystem 1002, but an HMM trained in the input language can still be part of the configuration of the chimaera HMM.

As described above, and in accordance with example embodiments, the HMM states of the chimaera HMM are initially the same as those of the output HMM are replaced by HMM states of the auxiliary HMM that are selected for being closest matches to HMM states of the output HMM. The matching operation is carried out under a transform that compensates for differences between the auxiliary speaker used to train the auxiliary HMM and the output speaker use to train the output HMM. Further details of the matching under transform technique are described below.

e. Matching Under Transform

In general terms, voice conversion is concerned with converting the voice of a "source speaker" to the voice of a "target speaker." For purposes of the discussion herein, the source speaker is designated X, and the target speaker is designated Y. These designations are intended for convenience of discussion, and other designations could be used. In the context of speech modeling (e.g., recognition and/or synthesis), feature analysis of speech samples of speaker X could generate a vector space of speech features, designated X-space. Similarly, feature analysis of speech samples of speaker Y could generate a vector space of speech features, designated Y-space. For example, feature vectors could correspond to parameterizations of spectral envelopes and/or excitation, as discussed above. In general, X-space and Y-space may be different. For example, they could have a different number of vectors and/or different parameters. Further, they could correspond to different languages, be generated using different feature extraction techniques, and so on.

Matching under transform may be considered a technique for matching the X-space and Y-space vectors under a transform that compensates for differences between speakers X and Y. It may be described in algorithmic terms as a computational method, and can be implemented as machine-readable instructions executable by the one or more processors of a computing system, such as a S2S system. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

By way of example, X-space may be taken to include N vectors, designated $\vec{x}_n$, n=1, ..., N. Similarly, Y-space may be taken to include Q vectors, designated $\vec{y}_q$, q=1, ..., Q. As noted, N and Q may not necessarily be equal, although the possibility that they are is not precluded. In the context of speech modeling, N and Q could correspond to a number of samples from speakers X and Y, respectively.

In accordance with example embodiments, matching under transform (MUT) uses a transformation function $\vec{y}=F(\vec{x})$ to convert X-space vectors to Y-space vectors, and applies a matching-minimization (MM) operation within a deterministic annealing framework to match each Y-space vector with one X-space vector. The transformation function defines a parametric mapping from X-space to Y-space. At the same time, a non-parametric, association mapping from Y-space to X-space may be defined in terms of conditional probabilities. Specifically, for a given X-space vector $\vec{x}_n$ and a given Y-space vector $\vec{y}_q$, an "association probability" $p(\vec{x}_n|\vec{y}_q)$ may be used to specify a probability that $\vec{y}_q$ maps to $\vec{x}_n$. In this way, MUT involves bi-directional mapping between X-space and Y-space: parametric in a "forward direction" (X→Y) via F(•), and non-parametric in the "backward direction" (Y→X) via $p(\vec{x}_n|\vec{y}_q)$.

A goal of MUT is to determine which X-space vectors $\vec{x}_n$ correspond to a Y-space $\vec{y}_q$ vector in the sense that $F(\vec{x})$ is close $\vec{y}_q$ in L2-norm, and under the circumstance that $F(\vec{x})$ and the probabilities $p(\vec{x}_n|\vec{y}_q)$ are not known ahead of time. Rather than searching for every possible mapping between X-space and Y-space vectors, a distortion metric between $\vec{x}_n$ and $\vec{y}_q$ may be defined as:

$$d(\vec{y}_q, \vec{x}_n) = (\vec{y}_q - F(\vec{x}_n))^T W_q (\vec{y}_q - F(\vec{x}_n)), \quad [1]$$

where $W_q$ is a weighting matrix depending on Y-space vector $\vec{y}_q$. Then taking $p(\vec{x}_n|\vec{y}_q)$ to be the joint probability of matching vectors $\vec{y}_q$ and $\vec{x}_n$, an average distortion over all possible vector combinations may be expressed as:

$$D = \Sigma_{n,q} p(\vec{y}_q, \vec{x}_n) d(\vec{y}_q, \vec{x}_n) = \Sigma_q p(\vec{y}_q) \Sigma_n p(\vec{x}_n|\vec{y}_q) d(\vec{y}_q, \vec{x}_n). \quad [2]$$

In the MUT approach, the bi-directional mapping provides a balance between forward and backward mapping, ensuring convergence to a meaningful solution.

Figure 11:
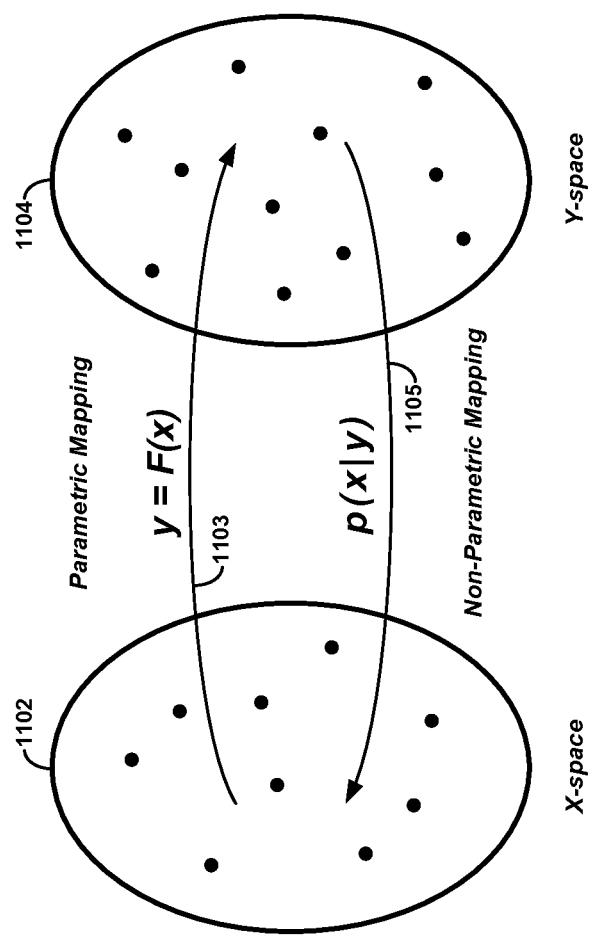
FIG. 11 is a conceptual illustration of parametric and non-parametric mapping between vector spaces, in accordance with an example embodiment.

FIG. 11 is a conceptual illustration of parametric and non-parametric mapping between vector spaces, in accordance with example embodiments. The figure includes an X-space 1102, represented as an oval containing several dots, each dot symbolically representing an X-space vector (e.g., $\vec{x}_n$). Similarly, a Y-space 1104 is represented as an oval containing several dots, each dot symbolically representing an Y-space vector (e.g., $\vec{y}_q$). For purposes of illustration, and by way of example, the two spaces are shown to contain a different number of vectors (dots). An arrow 1103 from X-space to Y-space symbolically represents parametric mapping given by $\vec{y}=F(\vec{x})$. In the opposite direction, an arrow 1105 from Y-space to X-space symbolically represents non-parametric mapping via $p(\vec{x}_n|\vec{y}_q)$.

In accordance with example embodiments, minimizing the average distortion D simultaneously for $F(\vec{x})$ and $p(\vec{x}_n|\vec{y}_q)$ $(\vec{x}_n|\vec{y}_q)$ may be achieved using techniques of simulated annealing. Specifically, an uncertainty in probabilistic matching between X-space and Y-space may be accounted for by an "association entropy," which can be expressed as H(Y,X)=H(Y)+H(X|Y). Taking $$p(\vec{y}_q) = \frac{1}{Q}$$

so as to ensure that all Y-space vectors are accounted for equally, it follows that H(Y) is constant. A composite minimization criterion D' may then be defined as:

$$D' = D - \lambda H(X|Y), \quad [3]$$

where the entropy Lagrangian λ corresponds to an annealing temperature.

Minimizing D' with respect to the association probabilities yields the associations. In the general case of λ≠0, the association probabilities may be expressed in the form of a Gibbs distribution and determined in what is referred to algorithmically herein as an "association step." When λ approaches zero, the mapping between Y-space and X-space becomes many to one (many Y-space vectors may be matched to one X-space vector). It can be shown in this case (λ→0) that the association probabilities may be determined from a search for the nearest X-space vector in terms of the distortion metric $d(\vec{y}_q | \vec{x}_n)$, in what is referred to algorithmically herein as a "matching step."

Given the associations determined either by an association step or a matching step, the transform function can be defined and its optimal parameters determined by solving a minimization of D' with respect to the defined form of F(•). This determination of $F(\vec{x})$ is referred to algorithmically herein as a "minimization step."

The purpose of the transform is to compensate for speaker differences between, in this example, speakers X and Y. More specifically, cross-speaker variability can be captured by a linear transform of the form $\vec{\mu}_k + \Sigma_k \vec{x}_n$, where $\vec{\mu}_k$ is a bias vector, and $\Sigma_k$ is linear transformation matrix of the k-th class. The linear transform matrix can compensate for differences in the vocal tract that are related to vocal tract shape and size. Accordingly, $F(\vec{x})$ may be defined as a mixture-of-linear-regressions function defined as:

$$F(\vec{x}_n) = \Sigma_{k=1}^K p((k|\vec{x}_n)[\vec{\mu}_k + \Sigma_k \vec{x}_n], \quad [4]$$

where $p(k|\vec{x}_n)$ is the probability that $\vec{x}_n$ belongs to the k-th class.

Assuming a class of probabilities $p(k|\vec{x}_n)$ corresponding to a Gaussian mixture model (GMM), and reformulating $\Sigma_k \vec{x}_n$ using the vector operator $\text{vec}\{\bullet\}$ and the Kronecker delta product to define $\vec{\sigma}_k \equiv \text{vec}\{\Sigma_k\}$, it can be shown that $F(\vec{x})$ may be expressed as:

$$F(\vec{x}_n) = [\Delta_n \ B_n]\begin{bmatrix}\vec{\mu}\\\vec{\sigma}\end{bmatrix} = \Gamma_n \vec{\gamma}, \quad [5]$$

where $$\Delta_n = [\ p(k=1|\vec{x}_n)I \ \ p(k=2|\vec{x}_n)I \ \ \ldots \ \ p(k=K|\vec{x}_n)I\ ], \quad [6]$$

$$\vec{\mu} = [\ \vec{\mu}_1^T \ \ \vec{\mu}_2^T \ \ \ldots \ \ \vec{\mu}_K^T\ ]^T, \quad [7]$$

$$B_n = [\ p(k=1|\vec{x}_n)X_n \ \ p(k=2|\vec{x}_n)X_n \ \ \ldots \ \ p(k=K|\vec{x}_n)X_n\ ], \quad [8]$$

$$\vec{\sigma} = [\ \vec{\sigma}_1'^T \ \ \vec{\sigma}_2'^T \ \ \ldots \ \ \vec{\sigma}_K'^T\ ]^T. \quad [9]$$

In the above expressions, I is the identity matrix (appropriately dimensioned), $\sigma_k' \equiv \text{vec}\{\Sigma_k'\}$ contains only the free parameters of the structured matrix $\Sigma_k$, and $\Sigma_k \vec{x}_n = X_n \vec{\sigma}_k'$. The optimal $\vec{\gamma}$ can then be obtained by partial differentiation, setting $$\frac{\partial D'}{\partial \vec{\gamma}} = 0.$$

Doing so yields the following unique solution:

$$\vec{\gamma} = -(\Sigma_q p(\vec{y}_q) \Sigma_n p(\vec{x}_n | \vec{y}_q) \Gamma_n^T W_q \Gamma_n)^{-1} (\Sigma_q p(\vec{y}_q) \Sigma_n p(\vec{x}_n | \vec{y}_q) \Gamma_n^T W_q \vec{y}_q). \quad [10]$$

Based on the discussion above, two algorithms may be used to obtain matching under transform. The first is referred to herein as "association-minimization," and the second is referred to herein as "matching-minimization." In accordance with example embodiments, association-minimization may be implemented with the following steps:

1. Initialization.
2. Set λ to high value (e.g., λ=1).
3. Association step.
4. Minimization step.
5. Repeat from step 3 until convergence.
6. Lower λ according to a cooling schedule and repeat from step 3, until λ approaches zero or other target value.

Initialization sets a starting point for MUT optimization, and may differ depending on the speech features used. For conversion of mel-cepstral coefficient (MCEP) parameters, a search for a good vocal-tract length normalization transform with a single linear frequency warping factor may suffice. Empirical evidence suggests that an adequate initialization transform is one that minimizes the distortion in an interval [0.7, 1.3] of frequency warping factor. The association step uses the Gibbs distribution function for the association probabilities, as described above. The minimization step then incorporates the transformation function. Steps 5 and 6 iterate for convergence and cooling.

In further accordance with example embodiments, matching-minimization may be implemented with the following steps:

1. Initialization.
2. Matching step.
3. Minimization step.
4. Repeat from step 2 until convergence.

Initialization is the same as that for association-minimization, starting with a transform that minimizes the distortion in an interval of values of [0.7, 1.3] in linear frequency warping factor. The matching step uses association probabilities determined from a search for the nearest X-space vector, as described above. The minimization step then incorporates the transformation function. Step 5 iterates for convergence. Note that there is no cooling step, since matching-minimization assumes λ=0.

In certain practical circumstances, matching-minimization may yield comparable results to association-minimization, but at lower computation cost. Accordingly, only matching-minimization is considered below for MUT. It will be appreciated that the techniques discussed below could be generalized for application to association-minimization.

As described above in the context of HMM-based voice conversion, matching under transform may be used for determining the closest matching HMM state from the auxiliary HMM to each HMM state of the output HMM. In accordance with example embodiments, this matching may be accomplished by implementing the matching-minimization algorithm described above. For example, as discussed in connection with FIG. 9A, for both the auxiliary HMM and the output HMM discussed above, each Gaussian state jointly models either the spectral envelope parameters and their delta and delta-delta values, or the excitation parameters and their delta and delta-delta values. The matching-minimization algorithm may be applied separately for both spectral envelope parameters and for excitation parameters in order to match Gaussian states of the auxiliary and output HMMs. Since the procedure is largely the same for both spectral envelope parameters and for excitation parameters, no explicit distinction is made between parameter types in relation to the Gaussian states referenced in the discussion below.

For each Gaussian state of the output HMM, a corresponding Gaussian state of the auxiliary HMM that is nearest in terms of a distance criterion based on mean-squared-error (mse) may be determined as follows. Matching is first initialized by scanning a range of values from 0.7 to 1.3 of linear warping factor that minimizes the overall distortion. This may be accomplished by resampling the relevant parameter (spectral envelope or excitation) at the linearly warped frequency factor. The matching-minimization algorithm may then be run with a single class transform to obtain the matching between the means of the HMM-state Gaussians of the output HMM and the means of the HMM-state Gaussians of the auxiliary HMM. The single class transform serves to compensate speaker differences such that the only source of distortion arises from language mismatch.

The accuracy of the results of the matching-minimization procedure helps ensure high-quality voice conversion using the chimaera HMM with the HMM states replaced by those determined from the matching. The matching-minimization procedure may also be implemented efficiently and cost-effectively, thereby contributing to overall scalability of a S2S system that incorporates voice conversion. Furthermore, HMM state matching can be applied to robust, independently-constructed and configured auxiliary and output HMMs, thereby enabling cross-lingual voice conversion to be implemented in a scalable fashion for any arbitrary pair of languages.

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed is:

1. A method comprising:
training an output hidden Markov model (HMM) based speech features generator implemented by one or more processors of a system using speech signals of an output speaker speaking an output language, wherein the output HMM based speech features generator comprises a first configuration of output HMM state models, each of the output HMM state models having a set of generator-model functions;
training an auxiliary HMM based speech features generator implemented by one or more processors of the system using speech signals of an auxiliary speaker speaking an input language, wherein the auxiliary HMM based speech features generator comprises a second configuration of auxiliary HMM state models, each of the auxiliary HMM state models having a set of generator-model functions;
for each given output HMM state model of the first configuration, determining a particular set of generator-model functions from among the auxiliary HMM state models of the second configuration that most closely matches the set of generator-model functions of the given output HMM;
determining a fundamental frequency (F0) transform that speech-adapts F0 statistics of the output HMM based speech features generator to match F0 statistics of the auxiliary HMM based speech features generator;
determining a duration transform that speech-adapts duration statistics of the output HMM based speech features generator to match duration statistics of the auxiliary HMM based speech features generator;
constructing a chimaera HMM based speech features generator implemented by one or more processors of the system to be the same as the output HMM based speech features generator, but wherein the set of generator-model functions of each output HMM state model of the chimaera HMM based speech features generator is replaced with the determined particular most closely matching set of generator-model functions; and
speech-adapting F0 statistics and duration statistics of the chimaera HMM based speech features generator using the F0 transform and duration transform, respectively.

2. The method of claim 1, wherein the output HMM based speech features generator, the auxiliary HMM based speech features generator, and the chimaera HMM based speech features generator are implemented by at least one common processor from among the one or more processors of the system.

3. The method of claim 1, further comprising determining speech-adaptation transforms that speech-adapt the auxiliary HMM based speech features generator to speech signals of an input speaker speaking the input language.

4. The method of claim 3, further comprising:
receiving run-time input speech signals of the input speaker speaking the input language;
generating an enriched transcription in the output language of the received run-time input speech signals;
speech-adapting the output HMM state models of the chimaera HMM based speech features generator using the determined speech-adaptation transforms to thereby produce a speech-adapted chimaera HMM based speech features generator;
using the speech-adapted chimaera HMM based speech features generator to convert the enriched transcription into corresponding output speech features in the output language; and
synthesizing a spoken utterance of the enriched transcription in the output language using the output speech features.

5. The method of claim 4, wherein generating the enriched transcription in the output language of the received run-time input speech signals comprises:
converting the received run-time input speech signals into text in the input language;
translating the text in the input language into translated text in the output language; and
converting the translated text into the enriched transcription in the output language.

6. The method of claim 1, wherein the input language and the output language are different.

7. The method of claim 1, wherein the set of generator-model functions for each given output HMM state model comprises a multivariate spectral probability density function (PDF) for jointly modeling spectral envelope parameters of a phonetic unit of the output language modeled by a given output HMM state model, and a multivariate excitation PDF for jointly modeling excitation parameters of the phonetic unit of the output language,
wherein the set of generator-model functions for each given auxiliary HMM state model comprises a multivariate spectral PDF for jointly modeling spectral envelope parameters of a phonetic unit of the input language modeled by the given auxiliary HMM state model, and a multivariate excitation PDF for jointly modeling excitation parameters of the phonetic unit of the input language,
and wherein determining for each given output HMM state model the particular set of generator-model functions from among the auxiliary HMM state models of the second configuration that most closely matches the set of generator-model functions of the given output HMM comprises:
determining a multivariate spectral PDF from among the auxiliary HMM state models that is computationally nearest to the multivariate spectral PDF of the given output HMM state model in terms of a distance criterion based on one of mean-squared-error (mse) or Kullback-Leibler distance; and determining a multivariate excitation PDF from among the auxiliary HMM state models that is computationally nearest to the multivariate excitation PDF of the given output HMM state model in terms of a distance criterion based on one of mse or Kullback-Leibler distance.

8. The method of claim 7, wherein the multivariate spectral PDF of at least one output HMM state model has the mathematical form of a multivariate Gaussian function, and wherein the multivariate spectral PDF of at least one auxiliary HMM state model has the mathematical form of a multivariate Gaussian function.

9. The method of claim 7, wherein the phonetic unit of the output language is one of a phoneme or a triphone.

10. The method of claim 7, wherein the spectral envelope parameters of the phonetic unit of the output language are Mel Cepstral coefficients, Line Spectral Pairs, Linear Predictive coefficients, or Mel-Generalized Cepstral Coefficients, and further include indicia of first and second time derivatives of the spectral envelope parameters of the phonetic unit of the output language, and wherein the spectral envelope parameters of the phonetic unit of the input language are Mel Cepstral coefficients, Line Spectral Pairs, Linear Predictive coefficients, or Mel-Generalized Cepstral Coefficients, and further include indicia of first and second time derivatives of the spectral envelope parameters of the phonetic unit of the input language.

11. The method of claim 1, wherein determining for each given output HMM state model the particular set of generator-model functions from among the auxiliary HMM state models of the second configuration that most closely matches the set of generator-model functions of the given output HMM comprises:

making a determination an optimal correspondence between a multivariate probability density function (PDF) of the given output HMM and a particular multivariate PDF from among the auxiliary HMM state models, the determination being made under a transform that compensates for differences between speech of the output speaker and speech of the auxiliary speaker.

12. The method of claim 1, wherein constructing the chimaera HMM based speech features generator comprises transforming the output HMM based speech features generator into the chimaera HMM based speech features generator by replacing each output HMM state model of the output HMM based speech features generator with the determined particular most closely matching set of generator-model functions, and wherein speech-adapting the F0 statistics and the duration statistics of the chimaera HMM based speech features generator using the F0 transform and duration transform, respectively, comprises speech-adapting the F0 statistics and the duration statistics of the transformed output HMM based speech features generator using the F0 transform and duration transform.

13. A method comprising:

implementing an output hidden Markov model (HMM) based speech features generator by one or more processors of a system, wherein the output HMM based speech features generator comprises a first configuration of output HMM state models, each of the output HMM state models having a set of generator-model functions, and wherein the implemented output HMM based speech features generator is trained using speech signals of an output speaker speaking an output language;

implementing an auxiliary HMM based speech features generator by one or more processors of the system, wherein the auxiliary HMM based speech features generator comprises a second configuration of auxiliary HMM state models, each of the auxiliary HMM state models having a set of generator-model functions, and wherein the implemented auxiliary HMM based speech features generator is trained using speech signals of an auxiliary speaker speaking an input language;

implementing a chimaera HMM based speech features generator that is the same as the output HMM based speech features generator, but wherein (i) the set of generator-model functions of each given output HMM state model of the chimaera HMM based speech features generator is replaced with a particular set of generator-model functions from among the auxiliary HMM state models of the second configuration that most closely matches the set of generator-model functions of the given output HMM, (ii) fundamental frequency (F0) statistics of the chimaera HMM based speech features generator are speech-adapted using an F0 transform that speech-adapts F0 statistics of the output HMM based speech features generator to match F0 statistics of the auxiliary HMM based speech features generator, and (iii) duration statistics of the chimaera HMM based speech features generator are speech-adapted using a duration transform that speech-adapts duration statistics of the output HMM based speech features generator to match duration statistics of the auxiliary HMM based speech features generator;

determining speech-adaptation transforms that speech-adapt the auxiliary HMM based speech features generator to speech signals of an input speaker speaking the input language;

at an input device of the system, receiving a run-time utterance of the input speaker speaking the input language;

generating an enriched transcription in the output language of the received run-time utterance;

speech-adapting the output HMM state models of the chimaera HMM based speech features generator using the determined speech-adaptation transforms to thereby produce a speech-adapted chimaera HMM based speech features generator; and synthesizing speech in the output language, using the speech-adapted chimaera HMM based speech features generator to generate voice-converted speech features in the output language from the enriched transcription so that the synthesized speech has voice characteristics of the input speaker.

14. A system comprising:

one or more processors;

memory; and machine-readable instructions stored in the memory, that upon execution by the one or more processors cause the system to carry out functions including:

implementing an output hidden Markov model (HMM) based speech features generator, wherein the output HMM based speech features generator comprises a first configuration of output HMM state models, each of the output HMM state models having a set of generator-model functions, and wherein the implemented output HMM based speech features generator is trained using speech signals of an output speaker speaking an output language;

implementing an auxiliary HMM based speech features generator, wherein the auxiliary HMM based speech features generator comprises a second configuration of auxiliary HMM state models, each of the auxiliary HMM state models having a set of generator-model functions, and wherein the implemented auxiliary HMM based speech features generator is trained using speech signals of an auxiliary speaker speaking an input language;

implementing a chimaera HMM based speech features generator that is the same as the output HMM based speech features generator, but wherein (i) the set of generator-model functions of each given output HMM state model of the chimaera HMM based speech features generator is replaced with a particular set of generator-model functions from among the auxiliary HMM state models of the second configuration that most closely matches the set of generator-model functions of the given output HMM, (ii) fundamental frequency (F0) statistics of the chimaera HMM based speech features generator are speech-adapted using an F0 transform that speech-adapts F0 statistics of the output HMM based speech features generator to match F0 statistics of the auxiliary HMM based speech features generator, and (iii) duration statistics of the chimaera HMM based speech features generator are speech-adapted using a duration transform that speech-adapts duration statistics of the output HMM based speech features generator to match duration statistics of the auxiliary HMM based speech features generator.

15. The system of claim 14, wherein the functions further include determining speech-adaptation transforms that speech-adapt the auxiliary HMM based speech features generator to speech signals of an input speaker speaking the input language.

16. The system of claim 15, wherein the functions further include:
receiving a run-time utterance of the input speaker speaking the input language;
generating an enriched transcription in the output language of the received run-time input speech signals;
speech-adapting the output HMM state models of the chimaera HMM based speech features generator using the determined speech-adaptation transforms to thereby produce a speech-adapted chimaera HMM based speech features generator;
using the speech-adapted chimaera HMM based speech features generator to convert the enriched transcription into corresponding output speech features in the output language; and
synthesizing a spoken utterance of the enriched transcription in the output language using the output speech features.

17. The system of claim 16, wherein generating the enriched transcription in the output language of the received run-time input speech signals comprises:
converting the received run-time utterance into text in the input language;
translating the text in the input language into translated text in the output language; and
converting the translated text into the enriched transcription in the output language.

18. The system of claim 14, wherein the input language and the output language are different.

19. The system of claim 14, wherein the set of generator-model functions for each given output HMM state model comprises a multivariate spectral probability density function (PDF) for jointly modeling spectral envelope parameters of a phonetic unit of the output language modeled by a given output HMM state model, and a multivariate excitation PDF for jointly modeling excitation parameters of the phonetic unit of the output language,
wherein the set of generator-model functions for each given auxiliary HMM state model comprises a multivariate spectral PDF for jointly modeling spectral envelope parameters of a phonetic unit of the input language modeled by the given auxiliary HMM state model, and a multivariate excitation PDF for jointly modeling excitation parameters of the phonetic unit of the input language,
and wherein the particular set of generator-model functions from among the auxiliary HMM state models of the second configuration that most closely matches the set of generator-model functions of the given output HMM is the particular set for which: (a) the multivariate spectral PDF is computationally nearest to the multivariate spectral PDF of the given output HMM state model in terms of a distance criterion based on one of mean-squared-error (mse) or Kullback-Leibler distance, and (b) the multivariate excitation PDF is computationally nearest to the multivariate excitation PDF of the given output HMM state model in terms of a distance criterion based on one of mse or Kullback-Leibler distance.

20. The system of claim 19, wherein the multivariate spectral PDF of at least one output HMM state model has the mathematical form of a multivariate Gaussian function,
and wherein the multivariate spectral PDF of at least one auxiliary HMM state model has the mathematical form of a multivariate Gaussian function.

21. The system of claim 19, wherein the phonetic unit of the output language is one of a phoneme or a triphone.

22. The system of claim 19, wherein the spectral envelope parameters of the phonetic unit of the output language are Mel Cepstral coefficients, Line Spectral Pairs, Linear Predictive coefficients, or Mel-Generalized Cepstral Coefficients, and further include indicia of first and second time derivatives of the spectral envelope parameters of the phonetic unit of the output language,
and wherein the spectral envelope parameters of the phonetic unit of the input language are Mel Cepstral coefficients, Line Spectral Pairs, Linear Predictive coefficients, or Mel-Generalized Cepstral Coefficients, and further include indicia of first and second time derivatives of the spectral envelope parameters of the phonetic unit of the input language.

23. The system of claim 14, wherein the particular set of generator-model functions from among the auxiliary HMM state models of the second configuration that most closely matches the set of generator-model functions of the given output HMM comprises a particular multivariate probability density function (PDF) from among the auxiliary HMM state models that optimally corresponds to a multivariate PDF of the given output HMM state model, the optimal correspondence being determined under a transform that compensates for differences between speech of the output speaker and speech of the auxiliary speaker.

24. The system of claim 14, wherein implementing the chimaera HMM based speech features generator comprises:
transforming the implemented output HMM based speech features generator into the chimaera HMM based speech features generator by replacing each output HMM state model of the output HMM based speech features generator with the particular most closely matching set of generator-model functions; and speech-adapting the F0 statistics and the duration statistics of the transformed output HMM based speech features generator using the F0 transform and duration transform.

25. A non-transitory computer-readable storage medium having stored thereon program instructions that, upon execution by one or more processors of a system, cause the system to perform operations comprising:
    implementing an output hidden Markov model (HMM) based speech features generator, wherein the output HMM based speech features generator comprises a first configuration of output HMM state models, each of the output HMM state models having a set of generator-model functions, and wherein the implemented output HMM based speech features generator is trained using speech signals of an output speaker speaking an output language;
    implementing an auxiliary HMM based speech features generator, wherein the auxiliary HMM based speech features generator comprises a second configuration of auxiliary HMM state models, each of the auxiliary HMM state models having a set of generator-model functions, and wherein the implemented auxiliary HMM based speech features generator is trained using speech signals of an auxiliary speaker speaking an input language;
    implementing a chimaera HMM based speech features generator that is the same as the output HMM based speech features generator, but wherein (i) the set of generator-model functions of each given output HMM state model of the chimaera HMM based speech features generator is replaced with a particular set of generator-model functions from among the auxiliary HMM state models of the second configuration that most closely matches the set of generator-model functions of the given output HMM, (ii) fundamental frequency (F0) statistics of the chimaera HMM based speech features generator are speech-adapted using an F0 transform that speech-adapts F0 statistics of the output HMM based speech features generator to match F0 statistics of the auxiliary HMM based speech features generator, and (iii) duration statistics of the chimaera HMM based speech features generator are speech-adapted using a duration transform that speech-adapts duration statistics of the output HMM based speech features generator to match duration statistics of the auxiliary HMM based speech features generator.

26. The non-transitory computer-readable storage medium of claim 25, wherein the operations further include determining speech-adaptation transforms that speech-adapt the auxiliary HMM based speech features generator to speech signals of an input speaker speaking the input language.

27. The non-transitory computer-readable storage medium of claim 26, wherein the operations further include:
    receiving a run-time utterance of the input speaker speaking the input language;
    generating an enriched transcription in the output language of the received run-time input speech signals;
    speech-adapting the output HMM state models of the chimaera HMM based speech features generator using the determined speech-adaptation transforms to thereby produce a speech-adapted chimaera HMM based speech features generator;
    using the speech-adapted chimaera HMM based speech features generator to convert the enriched transcription into corresponding output speech features in the output language; and
    synthesizing a spoken utterance of the enriched transcription in the output language using the output speech features.

28. The non-transitory computer-readable storage medium of claim 27, wherein generating the enriched transcription in the output language of the received run-time input speech signals comprises:
    converting the received run-time utterance into text in the input language;
    translating the text in the input language into translated text in the output language; and
    converting the translated text into the enriched transcription in the output language.

29. The non-transitory computer-readable storage medium of claim 25, wherein the input language and the output language are different.

30. The non-transitory computer-readable storage medium of claim 25, wherein the set of generator-model functions for each given output HMM state model comprises a multivariate spectral probability density function (PDF) for jointly modeling spectral envelope parameters of a phonetic unit of the output language modeled by a given output HMM state model, and a multivariate excitation PDF for jointly modeling excitation parameters of the phonetic unit of the output language,
    wherein the set of generator-model functions for each given auxiliary HMM state model comprises a multivariate spectral PDF for jointly modeling spectral envelope parameters of a phonetic unit of the input language modeled by the given auxiliary HMM state model, and a multivariate excitation PDF for jointly modeling excitation parameters of the phonetic unit of the input language,
    and wherein the particular set of generator-model functions from among the auxiliary HMM state models of the second configuration that most closely matches the set of generator-model functions of the given output HMM is the particular set for which: (a) the multivariate spectral PDF is computationally nearest to the multivariate spectral PDF of the given output HMM state model in terms of a distance criterion based on one of mean-squared-error (mse) or Kullback-Leibler distance, and (b) the multivariate excitation PDF is computationally nearest to the multivariate excitation PDF of the given output HMM state model in terms of a distance criterion based on one of mse or Kullback-Leibler distance.

31. The non-transitory computer-readable storage medium of claim 30, wherein the multivariate spectral PDF of at least one output HMM state model has the mathematical form of a multivariate Gaussian function,
    and wherein the multivariate spectral PDF of at least one auxiliary HMM state model has the mathematical form of a multivariate Gaussian function.

32. The non-transitory computer-readable storage medium of claim 30, wherein the phonetic unit of the output language is one of a phoneme or a triphone.

33. The non-transitory computer-readable storage medium of claim 30, wherein the spectral envelope parameters of the phonetic unit of the output language are Mel Cepstral coefficients, Line Spectral Pairs, Linear Predictive coefficients, or Mel-Generalized Cepstral Coefficients, and further include indicia of first and second time derivatives of the spectral envelope parameters of the phonetic unit of the output language,
    and wherein the spectral envelope parameters of the phonetic unit of the input language are Mel Cepstral coefficients, Line Spectral Pairs, Linear Predictive coefficients, or Mel-Generalized Cepstral Coefficients, and further include indicia of first and second time derivatives of the spectral envelope parameters of the phonetic unit of the input language.

34. The non-transitory computer-readable storage medium of claim 25, wherein the particular set of generator-model functions from among the auxiliary HMM state models of the second configuration that most closely matches the set of generator-model functions of the given output HMM comprises a particular multivariate probability density function (PDF) from among the auxiliary HMM state models that optimally corresponds to a multivariate PDF of the given output HMM state model, the optimal correspondence being determined under a transform that compensates for differences between speech of the output speaker and speech of the auxiliary speaker.

35. The non-transitory computer-readable storage medium of claim 25, wherein implementing the chimaera HMM based speech features generator comprises:
   transforming the implemented output HMM based speech features generator into the chimaera HMM based speech features generator by replacing each output HMM state model of the output HMM based speech features generator with the particular most closely matching set of generator-model functions; and
   speech-adapting the F0 statistics and the duration statistics of the transformed output HMM based speech features generator using the F0 transform and duration transform.

36. A non-transitory computer-readable storage medium, having stored thereon program instructions that, upon execution by one or more processors of a system, cause the system to perform operations comprising:
   training an output hidden Markov model (HMM) based speech features generator using speech signals of an output speaker speaking an output language, wherein the output HMM based speech features generator comprises a first configuration of output HMM state models, each of the output HMM state models having a set of generator-model functions;
   training an auxiliary HMM based speech features generator using speech signals of an auxiliary speaker speaking an input language, wherein the auxiliary HMM based speech features generator comprises a second configuration of auxiliary HMM state models, each of the auxiliary HMM state models having a set of generator-model functions;
   for each given output HMM state model of the first configuration, determining a particular set of generator-model functions from among the auxiliary HMM state models of the second configuration that most closely matches the set of generator-model functions of the given output HMM;
   determining a fundamental frequency (F0) transform that speech-adapts F0 statistics of the output HMM based speech features generator to match F0 statistics of the auxiliary HMM based speech features generator;
   determining a duration transform that speech-adapts duration statistics of the output HMM based speech features generator to match duration statistics of the auxiliary HMM based speech features generator;
   constructing a chimaera HMM based speech features generator implemented by one or more processors of the system to be the same as the output HMM based speech features generator, but wherein the set of generator-model functions of each output HMM state model of the chimaera HMM based speech features generator is replaced with the determined particular most closely matching set of generator-model functions; and
   speech-adapting F0 statistics and duration statistics of the chimaera HMM based speech features generator using the F0 transform and duration transform, respectively.

\* \* \* \* \*